(12) United States Patent
Su

(10) Patent No.: US 11,444,665 B2
(45) Date of Patent: Sep. 13, 2022

(54) INFORMATION SENDING METHOD, INFORMATION RECEIVING METHOD, SENDING APPARATUS, AND RECEIVING APPARATUS

(71) Applicant: HUAWEI TECHNOLOGIES CO., LTD., Guangdong (CN)

(72) Inventor: Liyan Su, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 16/930,037

(22) Filed: Jul. 15, 2020

(65) Prior Publication Data

US 2020/0350963 A1 Nov. 5, 2020

Related U.S. Application Data

(63) Continuation of application No. PCT/CN2018/073524, filed on Jan. 19, 2018.

(51) Int. Cl.
*H03D 3/02* (2006.01)
*H04B 7/0456* (2017.01)
*H04B 7/06* (2006.01)
*H04W 72/04* (2009.01)

(52) U.S. Cl.
CPC ........... *H04B 7/0456* (2013.01); *H04B 7/063* (2013.01); *H04B 7/0639* (2013.01); *H04W 72/0413* (2013.01)

(58) Field of Classification Search
CPC .... H04B 7/0456; H04B 7/063; H04B 7/0639; H04B 7/0862; H04W 72/0413; H04L 5/0016; H04L 5/0023; H04L 5/0091
USPC ....................................................... 370/329
See application file for complete search history.

(56) References Cited

U.S. PATENT DOCUMENTS

| 8,625,703 | B2* | 1/2014 | Ko ........................ H04B 7/0452 375/284 |
| 8,705,466 | B2* | 4/2014 | Jongren ............... H04B 7/0413 370/329 |
| 2008/0303699 | A1* | 12/2008 | Zhang ................. H04L 25/0204 341/67 |
| 2010/0054358 | A1 | 3/2010 | Ko et al. |

(Continued)

FOREIGN PATENT DOCUMENTS

| CN | 101978630 A | 2/2011 |
| CN | 102255643 A | 11/2011 |

(Continued)

OTHER PUBLICATIONS

Huawei, "Introduction of MUST in 36.212," 3GPP TSG RAN WG1 Meeting #87, R1-1611300, Reno, USA, Nov. 14-18, 2016, 10 pages.
Huawei, "Introduction of shortened processing time and shortened TTI into 36.212," 3GPP TSG RAN WG1 Meeting #90bis, R1-1719234, Prague, Czech, Oct. 9-13, 2017, 63 pages.
PCT International Search Report and Written Opinion issued in International Application No. PCT/CN2018/073524 dated Oct. 11, 2018, 14 pages (with English translation).

(Continued)

*Primary Examiner* — Helene E Tayong
(74) *Attorney, Agent, or Firm* — Fish & Richardson P.C.

(57) ABSTRACT

Embodiments of this application provide example information receiving methods and receiving apparatuses. One example information receiving method includes receiving, by a receiving apparatus, an index from a sending apparatus, wherein the index indicates precoding information used for a single codeword. The receiving apparatus can then determine, based on the index, the precoding information used for the single codeword.

19 Claims, 5 Drawing Sheets

(56) References Cited

U.S. PATENT DOCUMENTS

| | | | |
|---|---|---|---|
| 2012/0314678 A1* | 12/2012 | Ko | H04W 72/10 370/329 |
| 2013/0021991 A1* | 1/2013 | Ko | H04W 72/048 370/329 |
| 2013/0114656 A1 | 5/2013 | Sayana et al. | |
| 2018/0167958 A1* | 6/2018 | Yang | H04W 72/005 |
| 2018/0205431 A1* | 7/2018 | Nammi | H04B 7/0413 |
| 2020/0045692 A1* | 2/2020 | Ko | H04B 7/0456 |

FOREIGN PATENT DOCUMENTS

| | | |
|---|---|---|
| CN | 106605380 A | 4/2017 |
| EP | 2541796 A2 | 1/2013 |

OTHER PUBLICATIONS

3GPP TS 36-212 V12.9.0 (Dec. 2017), "3rd Generation Partnership Project; Technical Specification Group Radio Access Network; Evolved Universal Terrestrial Radio Access (E-UTRA); Multiplexing and channel coding (Release 12)," Dec. 2017, 95 pages.

3GPP TS 36.211 V12.4.0 (Dec. 2014), "3rd Generation Partnership Project; Technical Specification Group Radio Access Network; Evolved Universal Terrestrial Radio Access (E-UTRA); Physical channels and modulation (Release 12)," Dec. 2014, 124 pages.

Extended European Search Report issued in European Application No. 18901227.1 dated Sep. 23, 2020, 16 pages.

Office Action issued in Chinese Application No. 201880086528.1 dated Mar. 26, 2021, 5 pages.

* cited by examiner

INFORMATION SENDING METHOD, INFORMATION RECEIVING METHOD, SENDING APPARATUS, AND RECEIVING APPARATUS

CROSS-REFERENCE TO RELATED APPLICATIONS

This application is a continuation of International Application No. PCT/CN2018/073524, filed on Jan. 19, 2018, the disclosure of which is hereby incorporated by reference in its entirety.

TECHNICAL FIELD

This application relates to the communications field, and in particular, to an information sending method, an information receiving method, a sending apparatus, and a receiving apparatus.

BACKGROUND

A closed-loop spatial multiplexing transmission mode (transmission mode, TM for short) 4 is supported in an existing downlink long term evolution (long term evolution, LTE for short) system, and a closed-loop spatial multiplexing TM 2 is supported in an uplink LTE system. In the downlink TM 4 or the uplink TM 2, a network device needs to notify a terminal device of used precoding information by using physical layer signaling. In both the TM 4 and the TM 2, it is assumed that the systems support one or two codewords. Actually, not all systems support two codewords. For example, a short TTI (short TTI, sTTI for short) system supported by LTE and an LTE system that supports ultra-reliable low latency communications (ultra-reliable low latency communication, URLLC for short) support only single-codeword transmission.

SUMMARY

Embodiments of this application provide an information sending method, an information receiving method, a sending apparatus, and a receiving apparatus.

To achieve the foregoing objective, the embodiments of this application provide the following technical solutions.

According to a first aspect, an information sending method is provided, and includes: generating, by a sending apparatus, an index, where the index indicates precoding information used for a single codeword; and sending, by the sending apparatus, the index to a receiving apparatus.

According to a second aspect, an information receiving method is provided, and includes: receiving, by a receiving apparatus, an index from a sending apparatus, where the index indicates precoding information used for a single codeword; and determining, by the receiving apparatus based on the index, the precoding information used for the single codeword.

According to a third aspect, a sending apparatus is provided, and includes a communications unit and a processing unit, where the processing unit is configured to generate an index, and the index indicates precoding information used for a single codeword; and the communications unit is configured to send the index to a receiving apparatus.

According to a fourth aspect, a receiving apparatus is provided, and includes a communications unit and a processing unit, where the communications unit is configured to receive an index from a sending apparatus, and the index indicates precoding information used for a single codeword; and the processing unit is configured to determine, based on the index, the precoding information used for the single codeword.

According to a fifth aspect, a sending apparatus is provided, and includes a memory, a processor, and a communications interface, where the memory is configured to store a computer-executable instruction; the processor is configured to perform the following action based on the computer-executable instruction stored in the memory: generating an index, where the index indicates precoding information used for a single codeword; and the communications interface is configured to send the index to a receiving apparatus.

According to a sixth aspect, a receiving apparatus is provided, and includes a memory, a communications interface, and a processor, where the memory is configured to store a computer-executable instruction; the communications interface is configured to receive an index from a sending apparatus, where the index indicates precoding information used for a single codeword; and the processor is configured to perform the following action based on the computer-executable instruction stored in the memory: determining, based on the index, the precoding information used for the single codeword.

In the foregoing first to sixth aspects, the following designs are included.

In a possible design, the single codeword is a codeword sent by the sending apparatus to the receiving apparatus, and there are two antenna ports of the sending apparatus; or the single codeword is a codeword sent by the receiving apparatus to the sending apparatus, and there are two antenna ports of the receiving apparatus; and a quantity of values of indexes is less than or equal to 4. In the possible design, a maximum of four types of precoding information may be configured, so that an index is notified only by using no more than 2 bits, a quantity of bits of DCI is reduced, redundant information during PDCCH transmission is increased, and reliability of the DCI is improved.

In a possible design, the single codeword is the codeword sent by the sending apparatus to the receiving apparatus, and there are two antenna ports of the sending apparatus; and precoding information indicated by all values of indexes is the following four types of precoding information, precoding information indicated by all values of indexes includes at least two types of the following four types of precoding information, or precoding information indicated by all values of indexes includes the first type and the fourth type of the following four types of precoding information, where the first type of precoding information is a 2-layer transmit diversity; the second type of precoding information is that there is one transport layer for transmitting the single codeword, and a precoding matrix is $[1\ 1]^T/\sqrt{2}$; the third type of precoding information is that there is one transport layer for transmitting the single codeword, and a precoding matrix is $[1\ -1]^T/\sqrt{2}$; and the fourth type of precoding information is a precoding matrix reported by a latest precoding matrix indication PMI carried on a physical uplink shared channel PUSCH. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type and the third type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. Because the PMI reported by the receiving apparatus is used for the fourth type of precoding information, compared with the second type and the third type of precoding information, the fourth type of precoding information may allow different precoding for different frequency bands (on the premise that PMIs reported by UE are different). In this way, a precoding matrix used by the sending apparatus is more adaptive to a channel, and more received signal energy is increased, thereby improving a received signal-to-noise ratio and data transmission reliability. Finally, a maximum of four types of precoding information is included, so that the index is notified only by using no more than 2 bits, the quantity of bits of the DCI is reduced, the redundant information during the PDCCH transmission is increased, and the reliability of the DCI is improved.

In a possible design, the single codeword is the codeword sent by the sending apparatus to the receiving apparatus, and there are two antenna ports of the sending apparatus; and precoding information indicated by all values of indexes is the following four types of precoding information, precoding information indicated by all values of indexes includes at least two types of the following four types of precoding information, or precoding information indicated by all values of indexes includes the first type and the fourth type of the following four types of precoding information, where the first type of precoding information is a 2-layer transmit diversity; the second type of precoding information is that there is one transport layer for transmitting the single codeword, and a precoding matrix is $[1\ j]^T/\sqrt{2}$; the third type of precoding information is that there is one transport layer for transmitting the single codeword, and a precoding matrix is $[1\ -j]^T/\sqrt{2}$; and the fourth type of precoding information is a precoding matrix reported by a latest precoding matrix indication PMI carried on a physical uplink shared channel PUSCH. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type and the third type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. Because the PMI reported by the receiving apparatus is used for the fourth type of precoding information, compared with the second type and the third type of precoding information, the fourth type of precoding information may allow different precoding for different frequency bands (on the premise that PMIs reported by UE are different). In this way, a precoding matrix used by the sending apparatus is more adaptive to a channel, and more received signal energy is increased, thereby improving a received signal-to-noise ratio and data transmission reliability. Finally, a maximum of four types of precoding information is included, so that the index is notified only by using no more than 2 bits, the quantity of bits of the DCI is reduced, the redundant information during the PDCCH transmission is increased, and the reliability of the DCI is improved.

In a possible design, the single codeword is the codeword sent by the receiving apparatus to the sending apparatus, and there are two antenna ports of the receiving apparatus; and precoding information indicated by all values of indexes is the following four types of precoding information, or precoding information indicated by all values of indexes includes at least two types of the following four types of precoding information, where the first type of precoding information is a 2-layer transmit diversity; the second type of precoding information is that there is one transport layer for transmitting the single codeword, and a precoding matrix is $[1\ 1]^T/\sqrt{2}$; the third type of precoding information is that there is one transport layer for transmitting the single codeword, and a precoding matrix is $[1\ 0]^T/\sqrt{2}$; and the fourth type of precoding information is that there is one transport layer for transmitting the single codeword, and a precoding matrix is $[0\ 1]^T/\sqrt{2}$. In the possible design, the first type of precoding information may enable the receiving apparatus to redundantly send, when the receiving apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the fourth type of precoding information are corresponding to codebook-based precoding. The sending apparatus allocates precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. For the third type and the fourth type of precoding information, only one transmit antenna port is used to send data, so that energy of the receiving apparatus is saved.

In a possible design, the single codeword is a codeword sent by the sending apparatus to the receiving apparatus, and there are four antenna ports of the sending apparatus; or the single codeword is a codeword sent by the receiving apparatus to the sending apparatus, and there are four antenna ports of the receiving apparatus; and a quantity of values of indexes is less than or equal to 32. In the possible design, a maximum of 32 types of precoding information may be configured, so that an index is notified only by using no more than 5 bits, a quantity of bits of DC is reduced, redundant information during PDCCH transmission is increased, and reliability of the DCI is improved.

In a possible design, the single codeword is the codeword sent by the sending apparatus to the receiving apparatus, and there are four antenna ports of the sending apparatus; and precoding information indicated by all values of indexes includes the following 21 types of precoding information, precoding information indicated by all values of indexes includes at least 18 types of the following 21 types of precoding information, or precoding information indicated by all values of indexes includes the first type to the eighteenth type of the following 21 types of precoding information, where the first type of precoding information is a 4-layer transmit diversity; an $i^{th}$ type of precoding information is that there is one transport layer for transmitting the single codeword, a precoding matrix is a precoding matrix represented by a transmit precoding matrix indication TPMI, the TPMI=i−2, and i is an integer greater than or equal to 2 and less than or equal to 17; the eighteenth type of precoding information is that there is one transport layer for transmitting the single codeword, and a precoding matrix is a precoding matrix reported by a latest PMI carried on a PUSCH; the nineteenth type of precoding information is that there are two transport layers for transmitting the single codeword, and a precoding matrix is a precoding matrix reported by the latest PMI carried on the PUSCH; the twentieth type of precoding information is that there are three transport layers for transmitting the single codeword, and a precoding matrix is a precoding matrix reported by the latest PMI carried on the PUSCH; and the twenty-first type of precoding information is that there are four transport layers for transmitting the single codeword, and a precoding matrix is a precoding matrix reported by the latest PMI carried on the PUSCH. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the seventeenth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. Because the PMI reported by the receiving apparatus is used for the eighteenth type to the twenty-first type of precoding information, compared with the second type to the seventeenth type of precoding information, the eighteenth type to the twenty-first type of precoding information may allow different precoding for different frequency bands (on the premise that PMIs reported by the receiving apparatus are different). In this way, a precoding matrix used by the sending apparatus is more adaptive to a channel, and more received signal energy is increased, thereby improving a received signal-to-noise ratio and data transmission reliability.

In a possible design, the single codeword is the codeword sent by the sending apparatus to the receiving apparatus, and there are four antenna ports of the sending apparatus; and precoding information indicated by all values of indexes includes the following 13 types of precoding information, precoding information indicated by all values of indexes includes at least 10 types of the following 13 types of precoding information, or precoding information indicated by all values of indexes includes the first type to the tenth type of the following 13 types of precoding information, where the first type of precoding information is a 4-layer transmit diversity; an $i^{th}$ type of precoding information is that there is one transport layer for transmitting the single codeword, a precoding matrix is a precoding matrix represented by a TPMI, the TPMI=a(i−2), and i is an integer greater than or equal to 2 and less than or equal to 9, where a0, a1, . . . , a6, and a7 are seven different values in 0, 1, . . . , 14, and 15; the tenth type of precoding information is that there is one transport layer for transmitting the single codeword, and a precoding matrix is a precoding matrix reported by a latest PMI carried on a PUSCH; the eleventh type of precoding information is that there are two transport layers for transmitting the single codeword, and a precoding matrix is a precoding matrix reported by the latest PMI carried on the PUSCH; the twelfth type of precoding information is that there are three transport layers for transmitting the single codeword, and a precoding matrix is a precoding matrix reported by the latest PMI carried on the PUSCH; and the thirteenth type of precoding information is that there are four transport layers for transmitting the single codeword, and a precoding matrix is a precoding matrix reported by the latest PMI carried on the PUSCH. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the ninth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. Because the PMI reported by the receiving apparatus is used for the tenth type to the thirteenth type of precoding information, compared with the second type to the ninth type of precoding information, the tenth type to the thirteenth type of precoding information may allow different precoding for different frequency bands (on the premise that PMIs reported by the receiving apparatus are different). In this way, a precoding matrix used by the sending apparatus is more adaptive to a channel, and more received signal energy is increased, thereby improving a received signal-to-noise ratio and data transmission reliability.

In a possible design, the single codeword is a codeword sent by the receiving apparatus to the sending apparatus, and there are four antenna ports of the receiving apparatus; and precoding information indicated by all values of indexes includes the following 25 types of precoding information, where the first type of precoding information is a 4-layer transmit diversity; and an $i^{th}$ type of precoding information is that there is one transport layer for transmitting the single codeword, a precoding matrix is a precoding matrix represented by a TPMI, the TPMI=i−2, and i is an integer greater than or equal to 2 and less than or equal to 25. In the possible design, the first type of precoding information may enable the receiving apparatus to redundantly send, when the receiving apparatus does not know channel information, the same data by using a plurality of transmit antennas, thereby improving a received signal-to-noise ratio and data transmission reliability of the sending apparatus. In addition, a PMI feedback is not required in this solution, and therefore, a receiving apparatus in high-speed movement can be supported. The second type to the twenty-fifth type of precoding information are corresponding to codebook-based precoding. The sending apparatus allocates precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

In a possible design, the single codeword is a codeword sent by the sending apparatus to the receiving apparatus, and there are two antenna ports of the sending apparatus; or the single codeword is a codeword sent by the receiving apparatus to the sending apparatus, and there are two antenna ports of the receiving apparatus; and there are two columns in a precoding matrix corresponding to precoding information indicated by an index corresponding to at least one of values of indexes. In the possible design, because there may be two columns in the precoding matrix corresponding to the precoding information indicated by the index, multi-layer transmission having a specific quantity of layers may be configured in a system that supports only the single codeword, thereby improving transmission efficiency of the system.

In a possible design, the single codeword is the codeword sent by the sending apparatus to the receiving apparatus, and there are two antenna ports of the sending apparatus; and all values of indexes include the following eight types of precoding information, where the first type of precoding information is a 2-layer transmit diversity; the second type of precoding information is that there is one transport layer for transmitting the single codeword, and a precoding matrix is $[1\ 1]^T/\sqrt{2}$; the third type of precoding information is that there is one transport layer for transmitting the single codeword, and a precoding matrix is $[1\ -1]^T/\sqrt{2}$; the fourth type of precoding information is that there is one transport layer for transmitting the single codeword, and a precoding matrix is $[1\ j]^T/\sqrt{2}$; the fifth type of precoding information is that there is one transport layer for transmitting the single codeword, and a precoding matrix is $[1\ -j]^T/\sqrt{2}$; the sixth type of precoding information is that there are two transport layers for transmitting the single codeword, and a precoding matrix is $$\frac{1}{2}\begin{bmatrix} 1 & 1 \\ 1 & -1 \end{bmatrix};$$

the seventh type of precoding information is that there are two transport layers for transmitting the single codeword, and a precoding matrix is $$\frac{1}{2}\begin{bmatrix} 1 & 1 \\ j & -j \end{bmatrix};$$

and the eighth type of precoding information is that a precoding matrix is a precoding matrix reported by a latest PMI carried on a PUSCH. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the fifth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. The sixth type and the seventh type of precoding information are corresponding to codebook-based precoding. The sending apparatus may allocate, based on the PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there are two transport layers for transmitting each single codeword, and compared with a case in which there is one transport layer, more data can be transmitted when there are two transport layers. Because the PMI reported by the receiving apparatus is used for the eighth type of precoding information, compared with the second type to the seventh type of precoding information, the eighth type of precoding information may allow different precoding for different frequency bands (on the premise that PMIs reported by UE are different). In this way, a precoding matrix used by the sending apparatus is more adaptive to a channel, and more received signal energy is increased, thereby improving a received signal-to-noise ratio and data transmission reliability.

In a possible design, the single codeword is the codeword sent by the receiving apparatus to the sending apparatus, and there are two antenna ports of the receiving apparatus; and all values of indexes include the following eight types of precoding information, where the first type of precoding information is a 2-layer transmit diversity; an $i^{th}$ type of precoding information is that there is one transport layer for transmitting the single codeword, a precoding matrix is a precoding matrix represented by a TPMI, the TPMI=i−2, and i is an integer greater than 2 and less than or equal to 7; and the eighth type of precoding information is that there are two transport layers for transmitting the single codeword, a precoding matrix is a precoding matrix represented by a TPMI, and the TPMI=0. In the possible design, the first type of precoding information may enable the receiving apparatus to redundantly send, when the receiving apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the seventh type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. The eighth type of precoding information is corresponding to codebook-based precoding. The sending apparatus may allocate, based on the PMI reported by the receiving apparatus, precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there are two transport layers for transmitting each single codeword, and compared with a case in which there is one transport layer, more data can be transmitted when there are two transport layers.

In a possible design, the single codeword is a codeword sent by the sending apparatus to the receiving apparatus, and there are four antenna ports of the sending apparatus; or the single codeword is a codeword sent by the receiving apparatus to the sending apparatus, and there are four antenna ports of the receiving apparatus; and there are three or four columns in a precoding matrix corresponding to precoding information indicated by an index corresponding to at least one of values of indexes. In the possible design, because there may be three or more than three columns in a precoding matrix corresponding to the precoding information indicated by the index, multi-layer transmission having a specific quantity of layers may be configured in a system that supports only the single codeword, thereby improving transmission efficiency of the system.

In a possible design, the single codeword is the codeword sent by the sending apparatus to the receiving apparatus, and there are four antenna ports of the sending apparatus; and all values of indexes include the following 61 types of precoding information, where the first type of precoding information is a 4-layer transmit diversity; an $i^{th}$ type of precoding information is that there is one transport layer for transmitting the single codeword, a precoding matrix is a precoding matrix represented by a TPMI, the TPMI=i−2, and i is an integer greater than or equal to 2 and less than or equal to 17; the eighteenth type of precoding information is that there is one transport layer for transmitting the single codeword, and a precoding matrix is a precoding matrix reported by a latest PMI carried on a PUSCH; a $j^{th}$ type of precoding information is that there are two transport layers for transmitting the single codeword, and a precoding matrix is a precoding matrix represented by a TPMI, the TPMI=j−19, and j is an integer greater than or equal to 19 and less than or equal to 34; the thirty-fifth type of precoding information is that there are two transport layers for transmitting the single codeword, and a precoding matrix is a precoding matrix reported by the latest PMI carried on the PUSCH; a $k^{th}$ type of precoding information is that there are three transport layers for transmitting the single codeword, a precoding matrix is a precoding matrix represented by a TPMI, the TPMI=k−36, and k is an integer greater than or equal to 36 and less than or equal to 51; the fifty-second type of precoding information is that there are three transport layers for transmitting the single codeword, and a precoding matrix is a precoding matrix reported by the latest PMI carried on the PUSCH; a $g^{th}$ type of precoding information is that there are four transport layers for transmitting the single codeword, a precoding matrix is a precoding matrix represented by a TPMI, the TPMI=a(g−53), and g is an integer greater than or equal to 53 and less than or equal to 60, where a0, a1, . . . , a6, and a7 are seven different values in 0, 1, . . . , 14, and 15; and the sixty-first type of precoding information is that there are four transport layers for transmitting the single codeword, and a precoding matrix is a precoding matrix reported by the latest PMI carried on the PUSCH. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the seventeenth type, the nineteenth type to the thirty-fourth type, the thirty-sixth type to the fifty-first type, and the fifty-third type to the sixtieth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there are one to four transport layers for transmitting the single codeword, and a quantity of layers required for various transmission rates may be supported through maximum flexibility. Because the PMI reported by the receiving apparatus is used for the eighteenth type, the thirty-fifth type, the fifty-second type, and the sixty-first type of precoding information, compared with the second type to the sixty-first type of precoding information, the eighteenth type, the thirty-fifth type, the fifty-second type, and the sixty-first type of precoding information may allow different precoding for different frequency bands (on the premise that PMIs reported by the receiving apparatus are different). In this way, a precoding matrix used by the sending apparatus is more adaptive to a channel, and more received signal energy is increased, thereby improving a received signal-to-noise ratio and data transmission reliability.

In a possible design, the single codeword is the codeword sent by the receiving apparatus to the sending apparatus, and there are four antenna ports of the receiving apparatus; and all values of indexes include the following 54 types of precoding information, where the first type of precoding information is a 4-layer transmit diversity; an $i^{th}$ type of precoding information is that there is one transport layer for transmitting the single codeword, a precoding matrix is a precoding matrix represented by a TPMI, the TPMI=i−2, and i is an integer greater than or equal to 2 and less than or equal to 25; a $j^{th}$ type of precoding information is that there are two transport layers for transmitting the single codeword, and a precoding matrix is a precoding matrix represented by a TPMI, the TPMI=j−26, and j is an integer greater than or equal to 26 and less than or equal to 41; a $k^{th}$ type of precoding information is that there are three transport layers for transmitting the single codeword, a precoding matrix is a precoding matrix represented by a TPMI, the TPMI=k−42, and k is an integer greater than or equal to 42 and less than or equal to 53; and the fifty-fourth type of precoding information is that there are four transport layers for transmitting the single codeword, a precoding matrix is a precoding matrix represented by a TPMI, and the TPMI=0. In the possible design, the first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported. The second type to the fifty-fourth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there are one to four transport layers for transmitting the single codeword, and a quantity of layers required for various transmission rates may be supported through maximum flexibility.

In a possible design, the index is an index in a table that is indicated by the sending apparatus to the receiving apparatus by using higher layer signaling, the table indicated by the sending apparatus to the receiving apparatus by using the higher layer signaling is one of a plurality of tables, and the table includes a correspondence between the index and the precoding information.

According to a seventh aspect, a computer-readable storage medium is provided, and includes an instruction. When the instruction is run on a computer, the computer is enabled to perform any method according to the first aspect or the second aspect.

According to an eighth aspect, a computer program product including an instruction is provided. When the computer program product is run on a computer, the computer is enabled to perform any method according to the first aspect or the second aspect.

For beneficial effects of any design in the seventh aspect or the eighth aspect, refer to beneficial effects of a corresponding design in the first aspect and the second aspect. Details are not described herein again.

DESCRIPTION OF EMBODIMENTS

The following describes the technical solutions in embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

In an LTE system, downlink and uplink data respectively are transmitted based on orthogonal frequency division multiplexing access (orthogonal frequency division multiplexing access, OFDMA for short) and single carrier-frequency division multiplexing access (single carrier-frequency division multiplexing access, SC-FDMA for short) technologies. A time-frequency resource is divided into an orthogonal frequency division multiplexing (orthogonal frequency division multiplexing, OFDM for short) symbol or an SC-FDMA symbol (both the OFDM symbol and the SC-FDMA symbol are time domain symbols, which are referred to as time domain symbols or symbols for short below) in a time domain dimension and a subcarrier in a frequency domain dimension. A minimum resource granularity is referred to as a resource element (resource element, RE for short), to be specific, the minimum resource granularity represents a time-frequency grid including a time domain symbol in time domain and a subcarrier in frequency domain. A typical basic structure of a time-frequency resource in the LTE system is a subcarrier spacing of 15 KHz (kilohertz), time domain symbol duration of about 70 μs, and cyclic prefix duration of about 4 μs to 6 μs. 14 symbols are usually included in every 1 ms.

Figure 1:
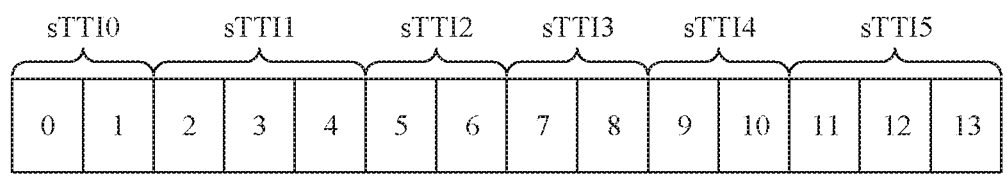
FIG. 1 is a schematic diagram of an sTTI configuration according to an embodiment of this application.

In the LTE system, service transmission is scheduled based on a base station. When scheduled on a physical layer, an upper-layer data packet is divided into small data packets in a unit of a transport block (transport block, TB for short), a basic time unit of the scheduling usually is a subframe (subframe), that is, 1 ms (because physically, a meaning of a transmission time interval (transmission time interval, TTI for short) is basically the same as that of a subframe, the TTI and the subframe are sometimes both used). One subframe usually includes two slots (slot), and one slot usually includes seven time domain symbols. In the LTE evolved system, a shorter time scheduling unit may be further considered. For example, in a scheduling manner in which one slot or even two or three time domain symbols are used as a unit, a time scheduling unit shorter than 1 ms is usually referred to as an sTTI. For example, referring to FIG. 1, one subframe is divided into six sTTIs, namely, an sTTI 0 to an sTTI 5, and a length of each sTTI is two or three symbols.

A normal scheduling process is that the base station sends control information (for example, downlink control information (downlink control information, DCI for short)) on a control channel (for example, a physical downlink control channel (physical downlink control channel, PDCCH for short) or a shortened physical downlink control channel (shortened PDCCH, sPDCCH for short)). The control information indicates a hybrid automatic repeat request (hybrid automatic repeat request, HARQ for short) process number and scheduling information that are corresponding to a TB in a physical downlink shared channel (physical downlink shared channel, PDSCH for short) or a physical uplink shared channel (physical uplink shared channel, PUSCH for short). The scheduling information includes control information such as resource allocation information (namely, a used time-frequency resource) and a modulation and coding scheme (modulation and coding scheme, MCS for short) index of the scheduled TB.

In the LTE system, a data transmission rate is multiplied by using a multiple-input multiple-output (multi-input multi-output, MIMO for short) technology. In a MIMO system, a plurality of parallel transmission channels are simultaneously established on a transmitter and a receiver by using a plurality of antennas, to be specific, in addition to time-domain and frequency-domain resources, a space-domain resource is introduced by using the plurality of antennas. In this way, an extremely high bandwidth utilization rate (a unit of the bandwidth utilization rate is bits/s/Hz, and it can be learned that the bandwidth utilization rate is calculated by directly superposing bandwidth utilization rates of the "plurality of parallel transmission channels") can be provided but related power effectiveness is not reduced. In other words, an extremely high data rate can be provided on a limited bandwidth but coverage is not significantly reduced. This is usually referred to as spatial multiplexing, which is a branch of the MIMO technology. The spatial multiplexing is mainly used to increase the data transmission rate. Data is divided into a plurality of streams, and the plurality of streams are simultaneously sent. The following further describes concepts in the embodiments. The concepts include a TB, a codeword (codeword, CW for short), a transport layer, precoding (precoding), and an antenna port (antenna port).

TB: Data sent from a medium access control (medium access control, MAC for short) layer to a physical layer is organized in a form of the TB. One TB is corresponding to one data block, and the data block is sent in one TTI, and further is a unit during HARQ retransmission. If user equipment (user equipment, UE for short) does not support spatial multiplexing, a maximum of one TB is sent in one TTI. If the UE supports spatial multiplexing, a maximum of two TBs are sent in one TTI.

Two points should be noted. (1) In a communication protocol, that the maximum of two TBs are sent in one TTI is described from a perspective of the UE. To be specific, for particular UE, during downlink transmission (non-carrier aggregation), the base station sends a maximum of two TBs to the UE in one TTI. During uplink transmission, the UE sends a maximum of two TBs to the base station in one TTI. From a perspective of the base station, the base station may schedule a plurality of UEs in one TTI. Therefore, the base station may simultaneously send or receive more than two TBs in one TTI. (2) In a carrier aggregation scenario, the UE may simultaneously receive data from a plurality of carriers, or send data by using a plurality of carriers. Therefore, more than two TBs may be sent or received in one TTI. However, corresponding to a particular carrier, the UE may send or receive a maximum of two TBs in one TTI.

Codeword: A codeword is a data code stream obtained after cyclic redundancy check (cyclic redundancy check, CRC for short) insertion, code block segmentation and CRC insertion into each code block, channel coding, and rate matching are performed on one TB sent in one TTI. Each codeword is corresponding to one TB. Therefore, one UE sends a maximum of two codewords in one TTI. The codeword may be considered as a TB with error protection.

Transport layer: After layer mapping is performed on a modulation symbol that is obtained by scrambling and modulating one or two CWs, the modulation symbol is mapped to a maximum of four transport layers. Each layer is corresponding to a valid data stream. A quantity of transport layers, namely, a quantity of layers, is referred to as a "transmission order" or a "transmission rank". The transmission rank may dynamically change. Such codeword-to-layer mapping may be considered as a process in which a codeword is equally divided into N parts, and each part is placed in one independent layer. N herein is equal to a quantity of layers to which one codeword needs to be mapped.

Figure 2:
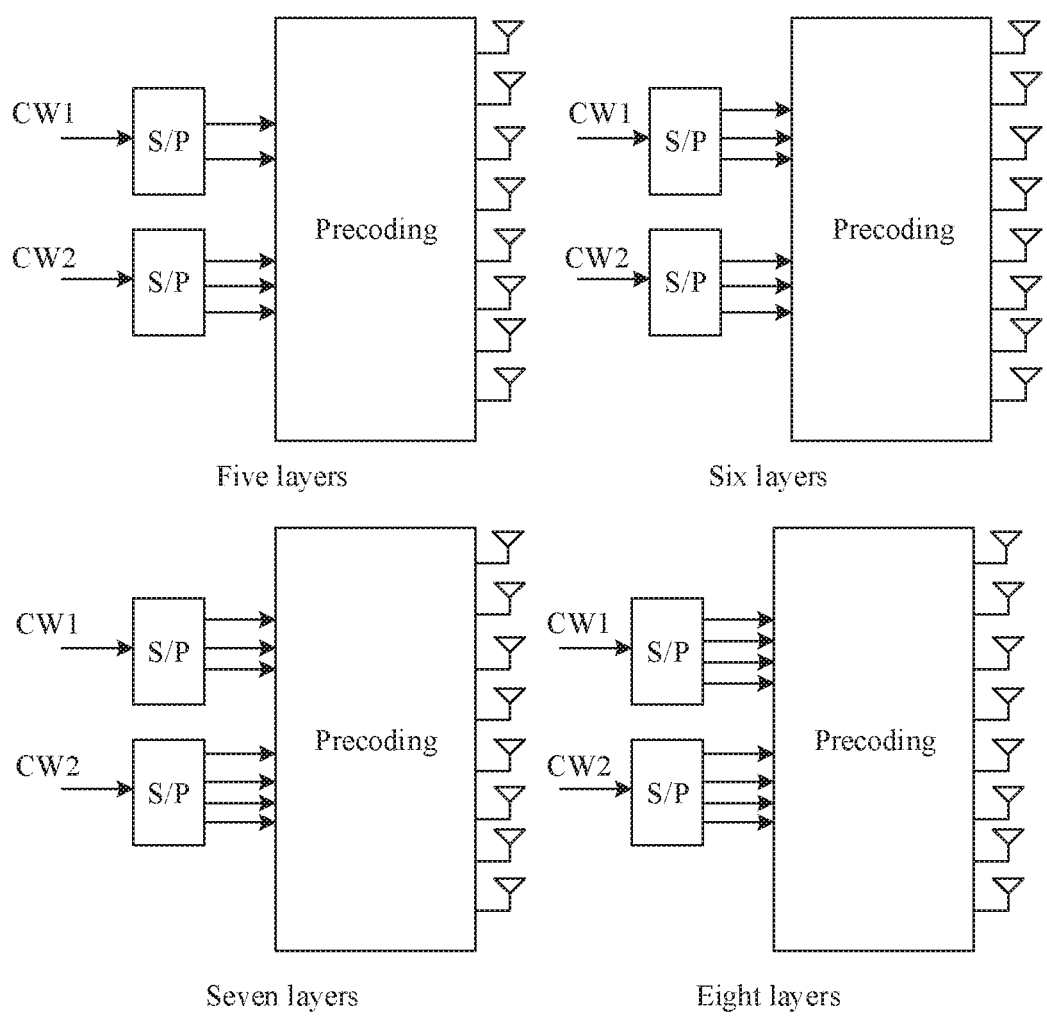
FIG. 2 is a schematic diagram of mapping between a codeword, a transport layer, and an antenna port according to an embodiment of this application.

Precoding: Precoding is a process of mapping a transport layer to an antenna port by using a precoding matrix. The precoding matrix is an R×P matrix, where R is a transmission rank, and P is a quantity of antenna ports. For example, FIG. 2 is a schematic diagram mapping between a codeword, a transport layer, and an antenna port. The codeword is mapped to the transport layer by using serial/parallel conversion (serial/parallel conversion, S/P for short), and then is mapped to the antenna port through precoding.

Figure 3:
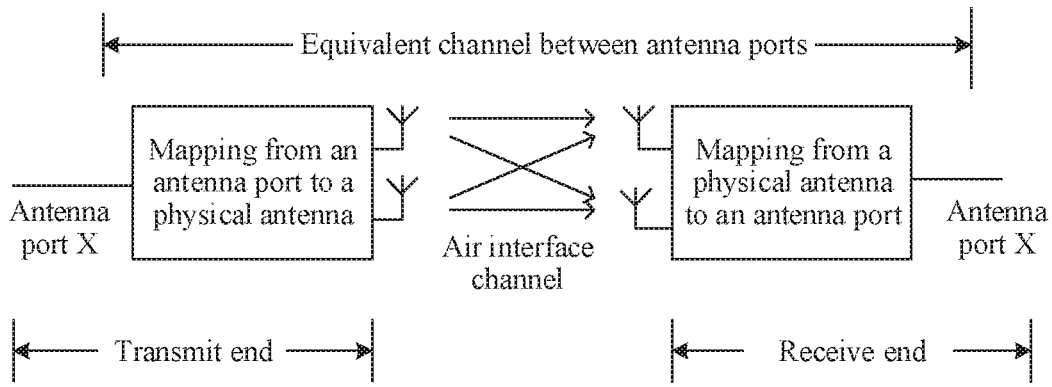
FIG. 3 is a schematic diagram of an equivalent channel between antenna ports according to an embodiment of this application.

Antenna port: An antenna port is a logic concept, to be specific, an antenna port may be a physical transmit antenna, or may be a combination of a plurality of physical transmit antennas (in this case, there is another "precoding" process before an antenna port is converted into a plurality of physical antennas). However, the UE does not distinguish between the two cases. To be specific, a receiver of the UE does not decompose signals from a same antenna port. From the perspective of the UE, the UE needs to consider only mapping from a port of a transmit end to a physical antenna, an air interface channel between physical antennas from the transmit end to a receive end, and mapping from a physical antenna to a port of the receive end as one equivalent channel. For example, referring to FIG. 3, FIG. 3 is a schematic diagram of an equivalent channel between antenna ports. Antenna ports of the receive end and the transmit end are the same. To be specific, both the base station and the UE have a same identifier of an antenna port. For example, the base station sends data at a layer on a port 7, indicating that the UE receives the data at the layer on the port 7.

Each antenna port is corresponding to a reference signal (reference signal, RS for short). The UE may obtain channel estimation of the antenna port based on the RS, and the channel estimation is used to demodulate data transmitted by using the antenna port. Each antenna port is corresponding to a group of REs for transmitting RSs.

A relationship between a quantity of TBs, a quantity of codewords, a quantity of transport layers, and a quantity of antenna ports is: the quantity of TBs=the quantity of codewords≤the quantity of transport layers≤the quantity of antenna ports.

Two downlink antenna precoding manners are supported by LTE: codebook-based precoding and non-codebook-based precoding. A main difference between the two manners is that in the former manner, channel estimation is performed by using a cell-specific reference signal, and a corresponding transmission mode is a TM 3/4/5/6, but in the latter manner, signal estimation is performed by using a UE-specific reference signal, and a corresponding transmission mode is a TM 7/8/9/10. In the embodiments of this application, the codebook-based precoding is mainly considered, and the following describes this part in detail.

During codebook-based precoding, channel estimation is performed by using a common reference signal (common reference signal, CRS for short). One cell has a maximum of four CRSs. Therefore, during the codebook-based precoding, a maximum of four antenna ports is supported, that is, transmission of a maximum of four layers is supported.

Figure 4:
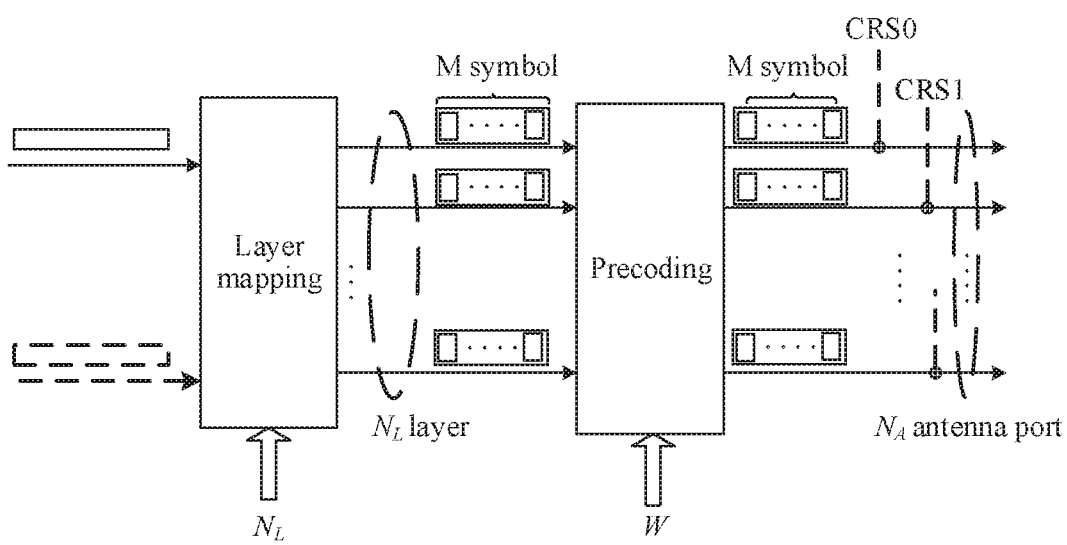
FIG. 4 is a schematic flowchart of codebook-based precoding processing according to an embodiment of this application.

FIG. 4 shows a basic flowchart of codebook-based precoding processing. A modulation symbol corresponding to one or two TBs are first mapped to an $N_L$ layer through layer mapping, and then mapped, at the layer, to an $N_A$ antenna port through precoding. W is a precoding matrix. An M symbol is data.

FIG. 4 further indicates that for the codebook-based precoding, a CRS is inserted into a corresponding antenna port after precoding. In this way, CRS-based channel estimation can be used to estimate only an equivalent channel between antenna ports, but cannot be used to estimate an equivalent channel between data layers. Therefore, to correctly demodulate a signal carried at each layer, UE needs to clearly learn of: 1. the equivalent channel between the antenna ports; and 2. a specific precoding matrix used at a transmit end. A base station explicitly notifies, by using corresponding DCI, the UE of precoding information used during current PDSCH transmission.

The codebook-based precoding is classified into closed-loop precoding and open-loop precoding. Main differences between the closed-loop precoding and the open-loop precoding are that precoding matrices have different structures, and manners of selecting precoding matrices and notifying the UE of the precoding matrices by the base station are different. This embodiment of this application relates to the closed-loop precoding.

During the closed-loop precoding, the base station selects a precoding matrix based on a feedback from the UE. Based on measurement of the CRS, the UE selects a proper quantity of transport layers and a proper precoding matrix, and feeds the proper quantity of transport layers and the proper precoding matrix back to the base station by using a rank indication (rank indication, RI for short) and a precoding matrix indication (precoding matrix indication, PMI for short). The RI and the PMI are merely suggestions provided by the UE, and the base station does not need to strictly comply with the RI and the PMI provided by the UE for transmission. If the base station reselects a quantity of transport layers or a precoding matrix, the base station needs to explicitly notify the UE. This is also an origin of "closed-loop".

To limit sizes of uplink signaling and downlink signaling, each rank defines only a precoding matrix of a limited set, and the set is also referred to as a codebook (codebook). During the codebook-based precoding, when the UE reports the PMI, and the base station selects a precoding matrix for the PDSCH transmission, both the UE and the base station select only one precoding matrix from a corresponding codebook. When the UE reports the PMI, or the base station notifies the UE of the selected precoding matrix, only an index corresponding to the precoding matrix needs to be notified.

The following specifically describes downlink precoding matrix sets (namely, codebooks) for distinguishing between the downlink precoding matrix sets by using different quantities of antenna ports.

(1) When there are two antenna ports, for details of a downlink codebook, refer to Table 1.

TABLE 1

2-antenna port downlink codebook

| Codebook index | Quantity of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

(2) When there are four antenna ports, for details of a downlink codebook, refer to Table 2.

TABLE 2

4-antenna port downlink codebook

| Codebook index | $u_n$ | Quantity of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2\ [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ k\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u^6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u^7 = [1\ (-1+j)/\sqrt{2}\ j\ (1+j)/\sqrt{2}]^T$ | $W_7^{\{1\}}$ | $W_7^{\{13\}}/\sqrt{3}$ | $W_7^{\{134\}}/\sqrt{3}$ | $W_7^{\{1324\}}/2$ |
| 8 | $u^8 = [1\ -1\ 1\ 1]^T$ | $W_8^{\{1\}}$ | $W_8^{\{12\}}/\sqrt{3}$ | $W_8^{\{124\}}/\sqrt{3}$ | $W_8^{\{1234\}}/2$ |
| 9 | $u^9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |

TABLE 2-continued 4-antenna port downlink codebook

| Codebook index | $u_n$ | Quantity of layers v | | | |
|---|---|---|---|---|---|
| | | 1 | 2 | 3 | 4 |
| 10 | $u^{10} = [1\ 1\ 1\ -1]^T$ | $W_{10}^{\{1\}}$ | $W_{15}^{\{12\}}/\sqrt{3}$ | $W_{10}^{\{123\}}/\sqrt{3}$ | $W_{10}^{\{1324\}}/2$ |
| 11 | $u^{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u^{12} = [1\ -1\ -1\ 1]^T$ | $W_{12}^{\{1\}}$ | $W_{12}^{\{12\}}/\sqrt{2}$ | $W_{12}^{\{134\}}/\sqrt{3}$ | $W_{12}^{\{1234\}}/2$ |
| 13 | $u^{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u^{14} = [1\ 1\ -1\ -1]^T$ | $W_{14}^{\{1\}}$ | $W_{14}^{\{13\}}/\sqrt{3}$ | $W_{14}^{\{123\}}/\sqrt{3}$ | $W_{14}^{\{3214\}}/2$ |
| 15 | $u^{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

For $W_n = I - 2u_n u_n^H / u_n^H u_n$, $W_n^{(s)}$ is of an $s^{th}$ column in a matrix $W_n$.

In a closed-loop MIMO mode (corresponding to closed-loop precoding), the UE needs to provide the base station with a feedback of a channel status: a channel quality indicator (channel quality indicator, CQI for short)/the RI/the PMI. Such a feedback mechanism can enable a transmitter to fully understand the channel status, thereby providing a higher rate. However, such a transmission pattern can provide optimal performance only when channel information is accurate enough and there is a rich multi-path environment. Therefore, closed-loop MIMO is usually used in a scenario in which the UE moves at a low speed. For example, the UE stays at a place, or the UE moves at a walking speed.

The foregoing describes precoding during downlink transmission. Similarly, during uplink transmission, the base station also needs to indicate precoding used by the terminal device during the uplink transmission. A slight difference between the uplink transmission and the downlink transmission is that during the uplink transmission, a single-carrier characteristic needs to be met, and therefore, a codebook used during the uplink transmission is different from that used during the downlink transmission.

The following specifically describes uplink codebooks for distinguishing between the uplink codebooks by using different quantities of antenna ports.

(3) When there are two antenna ports, for details of an uplink codebook, refer to Table 3.

TABLE 3

2-antenna port uplink codebook

| Codebook index | Quantity of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

(4) When there are four antenna ports, for details of an uplink codebook, refer to Table 4 (a quantity of layers is 1), Table 5 (a quantity of layers is 2), Table 6 (a quantity of layers is 3), and Table 7 (a quantity of layers is 4).

TABLE 4

4-antenna port uplink codebook, one layer

| Codebook index | Quantity of layers $\upsilon = 1$ | | | | | | | |
|---|---|---|---|---|---|---|---|---|
| 0-7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

TABLE 5

4-antenna port uplink codebook, two layers

| Codebook index | Quantity of layers $v = 2$ |
|---|---|
| 0-3 | $\frac{1}{2}\begin{bmatrix} 1 & 0 \\ 1 & 0 \\ 0 & 1 \\ 0 & -j \end{bmatrix}$ $\frac{1}{2}\begin{bmatrix} 1 & 0 \\ 1 & 0 \\ 0 & 1 \\ 0 & j \end{bmatrix}$ $\frac{1}{2}\begin{bmatrix} 1 & 0 \\ -j & 0 \\ 0 & 1 \\ 0 & 1 \end{bmatrix}$ $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ $\frac{1}{2}\begin{bmatrix} 1 & 0 \\ -1 & 0 \\ 0 & 1 \\ 0 & j \end{bmatrix}$ $\frac{1}{2}\begin{bmatrix} 1 & 0 \\ j & 0 \\ 0 & 1 \\ 0 & 1 \end{bmatrix}$ $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ $\frac{1}{2}\begin{bmatrix} 1 & 0 \\ 0 & 1 \\ 1 & 0 \\ 0 & -1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ $\frac{1}{2}\begin{bmatrix} 1 & 0 \\ 0 & 1 \\ 0 & -1 \\ 1 & 0 \end{bmatrix}$ $\frac{1}{2}\begin{bmatrix} 1 & 0 \\ 0 & 1 \\ 0 & 1 \\ -1 & 0 \end{bmatrix}$ $\frac{1}{2}\begin{bmatrix} 1 & 0 \\ 0 & 1 \\ 0 & -1 \\ -1 & 0 \end{bmatrix}$ |

TABLE 6

4-antenna port uplink codebook, three layers

| Codebook index | Quantity of layers $v = 3$ |
|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ $\frac{1}{2}\begin{bmatrix} 1 & 0 & 0 \\ -1 & 0 & 0 \\ 0 & 1 & 0 \\ 0 & 0 & 1 \end{bmatrix}$ $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ $\frac{1}{2}\begin{bmatrix} 1 & 0 & 0 \\ 0 & 1 & 0 \\ 0 & 0 & 1 \\ -1 & 0 & 0 \end{bmatrix}$ $\frac{1}{2}\begin{bmatrix} 0 & 1 & 0 \\ 1 & 0 & 0 \\ 1 & 0 & 0 \\ 0 & 0 & 1 \end{bmatrix}$ $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ $\frac{1}{2}\begin{bmatrix} 0 & 1 & 0 \\ 1 & 0 & 0 \\ 0 & 0 & 1 \\ -1 & 0 & 0 \end{bmatrix}$ $\frac{1}{2}\begin{bmatrix} 0 & 1 & 0 \\ 0 & 0 & 1 \\ 1 & 0 & 0 \\ 1 & 0 & 0 \end{bmatrix}$ $\frac{1}{2}\begin{bmatrix} 0 & 1 & 0 \\ 0 & 0 & 1 \\ 1 & 0 & 0 \\ -1 & 0 & 0 \end{bmatrix}$ |

TABLE 7

4-antenna port uplink codebook, four layers

| Codebook index | Quantity of layers $v = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

A fifth generation (fifth generation, 5G for short) includes an important technical requirement, namely, URLLC. Compact (compact) DCI is used to enhance reliability of a PDCCH, to be specific, some information in DCI of LTE is compressed, so that a DCI load size is reduced. Assuming that the base station allocates a same transmission resource to the DCI before and after the DCI is compressed, when compressed DCI is transmitted, a proportion of redundant information in a transmit signal is greater than that when the DCI is not compressed. The redundant information may have a check function. Therefore, due to more redundant information, reliability of PDCCH transmission during which the compact DCI is used is higher.

In an existing downlink LTE system, a closed-loop spatial multiplexing TM 4 is supported. The base station notifies, by using a precoding information field in a DCI format 2, the UE of a precoding matrix used during current PDSCH transmission. A size of the precoding information field in the DCI format 2 is shown in Table 8.

TABLE 8

Quantity of bits of precoding information in a DCI format 2

| Quantity of antenna ports | Quantity of bits of precoding information |
|---|---|
| 2 | 3 |
| 4 | 6 |

Explanation of the precoding information field is related to a quantity of the antenna ports and a quantity of enabled codewords. When two antenna ports are used, refer to the following Table 9. When four antenna ports are used, refer to the following Table 10. TPMIs in Table 10 are corresponding to precoding matrices written in Table 2. For example precoding information (briefly referred to as information below, namely, message) corresponding to an index 1 in the left column is "1 layer (layer): TPMI=0". In this case, the precoding matrix is $W_0^{(1)}$ corresponding to a column in which $9\upsilon=1$ and a row in which the TPMI=0=the codebook index in Table 2. $W_0$ is calculated by using $u_0$ based on the formula below Table 2, and then the first column in $W_0$ is the precoding matrix $W_0^{(i)}$.

TABLE 9

2-antenna port precoding information, DCI format

| One codeword enabled | | Two codewords enabled | |
|---|---|---|---|
| Index (Index) | Information (message) | Index (Index) | Information (message) |
| 0 | Two layers: transmit diversity (Transmit diversity) | 0 | Two layers: precoding matrix $\frac{1}{2}\begin{bmatrix} 1 & 1 \\ 1 & -1 \end{bmatrix}$ |
| 1 | One layer: precoding vector $[1\ 1]^T/\sqrt{2}$ | 1 | Two layers: precoding matrix $\frac{1}{2}\begin{bmatrix} 1 & 1 \\ j & -j \end{bmatrix}$ |
| 2 | One layer: precoding vector $[1\ -1]^T/\sqrt{2}$ | 2 | Two layers: precoding reported by a latest PMI carried on a PUSCH is used as a precoding matrix |
| 3 | One layer: precoding vector $[1\ j]^T/\sqrt{2}$ | 3-7 | Reserved (reserved) |
| 4 | One layer: precoding vector $[1\ -j]^T/\sqrt{2}$ | | |
| 5 | One layer: precoding reported by the latest PMI carried on the PUSCH is used as a precoding vector, and if a reported RI = 2, during precoding, the first column in a precoding matrix indicated by the PMI is used and is multiplied by $\sqrt{2}$ | | |
| 6 | One layer: precoding reported by the latest PMI carried on the PUSCH is used as a precoding vector, and if a reported RI = 2, during precoding, the second column in a precoding matrix indicated by the PMI is used and multiplied by $\sqrt{2}$ | | |
| 7 | Reserved (reserved) | | |

TABLE 10

4-antenna port precoding information, DCI format 2

| One codeword enabled | | Two codewords enabled | |
|---|---|---|---|
| Index (Index) | Information (Message) | Index (Index) | Information (Message) |
| 0 | Four layers: transmit diversity | 0 | Two layers: TPMI = 0 |
| 1 | One layer: TPMI = 0 | 1 | Two layers: TPMI = 1 |
| 2 | One layer: TPMI = 1 | . | . |
| . | . | . | . |
| . | . | . | . |
| . | . | 15 | Two layers: TPMI = 15 |
| 16 | One layer: TPMI = 15 | 16 | Two layers: precoding reported by a latest PMI carried on a PUSCH is used as precoding |
| 17 | One layer: precoding reported by the latest PMI carried | 17 | Three layers: TPMI = 0 |

TABLE 10-continued 4-antenna port precoding information, DCI format 2

| One codeword enabled | | Two codewords enabled | |
|---|---|---|---|
| Index (Index) | Information (Message) | Index (Index) | Information (Message) |
| | on the PUSCH is used as precoding | | |
| 18 | Two layers: TPMI = 0 | 18 | Three layers: TPMI = 1 |
| 19 | Two layers: TPMI = 1 | . | . |
| . | . | . | . |
| . | . | . | . |
| . | . | 32 | Three layers: TPMI = 15 |
| . | . | | |
| . | . | | |
| 33 | Two layers: TPMI = 15 | 33 | Three layers: precoding reported by the latest PMI carried on the PUSCH is used as precoding |
| 34 | Two layers: precoding reported by the latest PMI carried on the PUSCH is used as precoding | 34 | Four layers: TPMI = 0 |
| 35-63 | Reserved (reserved) | 35 | Four layers: TPMI = 1 |
| | | . | . |
| | | . | . |
| | | . | . |
| | | 49 | Four layers: TPMI = 15 |
| | | 50 | Four layers: precoding reported by the latest PMI carried on the PUSCH is used as precoding |
| | | 51-63 | Reserved (reserved) |

If only one TB is enabled, indexes 18 to 34 in Table 10 are used to support only retransmission of a corresponding TB, and the TB is previously transmitted in a two-layer closed-loop spatial multiplexing TM. In other words, only one of two TBs that are previously transmitted needs to be retransmitted.

In response to the suggested PMI reported by the UE, the base station may have the following two options. (1) The base station performs precoding by using the suggested PMI latest reported by the UE. In this case, precoding that is used during the PDSCH transmission and that is sent by the base station in a subframe n is selected based on the latest PMI in aperiodic CSI reported in or before a subframe n−4. (2) The base station reselects a different precoding matrix.

Regardless of an option of the base station, the UE may obtain a final precoding matrix by looking up Table 9 or Table 10 by using the precoding information field.

In an uplink LTE system, a closed-loop spatial multiplexing TM 2 is supported. The base station indicates, by using a precoding information field in a DCI format 4, a precoding matrix that is supposed to be used when the UE performs uplink transmission on the PUSCH. A size of the precoding information field in the DCI format 4 is shown in Table 11.

TABLE 11

Quantity of bits of precoding information in a DCI format 4

| Quantity of antenna ports | Quantity of bits of precoding information |
|---|---|
| 2 | 3 |
| 4 | 6 |

Explanation of the precoding information field is related to a quantity of the antenna ports and a quantity of enabled codewords. When two antenna ports are used, refer to the following Table 12. When four antenna ports are used, refer to the following Table 13. TPMIs in Table 12 are corresponding to precoding written in Table 3, and TPMIs in Table 13 are corresponding to precoding written in Table 4, Table 5, Table 6, and Table 7.

TABLE 12

2-antenna port precoding information, DCI format 4

| One codeword enabled | | Two codewords enabled | |
|---|---|---|---|
| Index (Index) | Information (Message) | Index (Index) | Information (Message) |
| 0 | One layer: TPMI = 0 | 0 | Two layers: TPMI = 0 |
| 1 | One layer: TPMI = 1 | 1-7 | Reserved (reserved) |
| 2 | One layer: TPMI = 2 | | |
| . | . | | |
| . | . | | |
| 5 | One layer: TPMI = 5 | | |
| 6-7 | Reserved (reserved) | | |

TABLE 13

4-antenna port precoding information, DCI format 4

| One codeword enabled | | Two codewords enabled | |
|---|---|---|---|
| Index (Index) | Information (Message) | Index (Index) | Information (Message) |
| 0 | One layer: TPMI = 0 | 0 | Two layers: TPMI = 0 |
| 1 | One layer: TPMI = 1 | 1 | Two layers: TPMI = 1 |
| . | . | . | . |
| . | . | . | . |
| . | . | . | . |
| 23 | One layer: TPMI = 23 | 15 | Two layers: TPMI = 15 |
| 24 | Two layers: TPMI = 0 | 16 | Three layers: TPMI = 0 |
| 25 | Two layers: TPMI = 1 | 17 | Three layers: TPMI = 1 |
| . | . | . | . |
| . | . | . | . |
| 39 | Two layers: TPMI = 15 | 27 | Three layers: TPMI = 11 |
| 40-63 | Reserved (reserved) | 28 | Four layers: TPMI = 0 |
| | | 29-63 | Reserved (reserved) |

After receiving DCI, the UE may obtain a final precoding matrix by looking up Table 12 or Table 13 by using the precoding information field.

In both a TM 4 and a TM 2, it is assumed that systems support one or two codewords. Actually, not all systems support two codewords, for example, an sTTI system supported by LTE. However, such systems still need to support a multi-layer transmission mode originally applied to 2-codeword transmission (a quantity of codewords needs to be less than or equal to a quantity of transport layers, and therefore, multi-layer transmission applied to 1-codeword transmission is also feasible). However, in the prior art, multi-layer transmission having a specific quantity of layers cannot be configured for a system that supports only one codeword, thereby limiting transmission efficiency of the system.

In addition, in the prior art, downlink and uplink precoding is notified by using 3-6 bits, and overheads are excessively high. Existing tables are applicable to all terminal devices. Therefore, all possible channel statuses of the terminal devices need to be considered, and appropriate quantities of transport layers needs to be allocated to the terminal devices (generally, when channel quality is better, a quantity of transport layers that can be supported is larger).

Channel quality of a terminal device is affected by an inherent parameter of the terminal device, for example, a quantity of antennas or a receiver algorithm. For a terminal device, channel quality of the terminal device is usually slowly changing. Therefore, considering such slowly changing information/statistical information, an amount of information that needs to be notified during precoding is actually less than 3-6 bits. In other words, in a system that supports only single-codeword transmission, the foregoing tables can be further compressed.

In an LTE evolved system, to reduce a receive/transmit latency, the base station may configure sTTI transmission for the UE. In this case, for the tables in existing LTE, because the sTTI system supports only the single-codeword transmission, some configurations cannot be actually applied to the sTTI system. This embodiment of this application may be applied between a network device and a terminal device in a wireless communications system, to perform short TI data transmission, or may be applied to another scenario in which only the single-codeword transmission is supported. The wireless communications system may be a 4.5G communications system, a 5G communications system, or a future wireless communications system.

In this embodiment of this application, a new precoding indication table is designed to support single-codeword multi-layer transmission (including uplink and downlink transmission). Therefore, the single-codeword transmission can also support transmission of sufficient layers, and flexibility of the quantity of layers and a precoding configuration is ensured for the sTTI system. Further, a quantity of bits occupied by the precoding information field may be reduced. The method may be specifically applied to the sTTI system.

Figure 5:
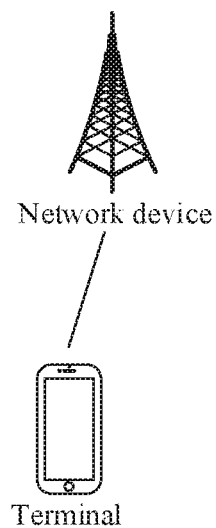
FIG. 5 is a schematic diagram of a network architecture according to an embodiment of this application.

As shown in FIG. 5, a network architecture in this application may include a network device and a terminal device. The terminal device may also be referred to as UE, for example, the UE mentioned in the foregoing embodiments.

The network device may be a base station (base station, BS for short) device, also referred to as a base station, an apparatus deployed in a radio access network to provide a wireless communication function. For example, in a 2G network, a device providing a base station function includes a base transceiver station (base transceiver station, BTS for short) and a base station controller (base station controller, BSC for short); in a 3G network, a device providing a base station function includes a NodeB (NodeB) and a radio network controller (radio network controller, RNC for short); in a 4G network, a device providing a base station function includes an evolved NodeB (evolved NodeB, eNB for short); and in a wireless local area network (wireless local area networks, WLAN for short), a device providing a base station function is an access point (access point, AP for short). In a 5G communications system, a device providing a base station function includes an eNB, a new radio NodeB (new radio nodeB, gNB for short), a centralized unit (centralized unit, CU for short), a distributed unit (distributed unit, DU for short), a new radio controller, and the like.

The terminal device may be a movable terminal device, or may be an immovable terminal device. The device is mainly configured to receive or send service data. Terminal devices may be distributed in networks. Terminal devices have different names in different networks, for example, a terminal, a mobile station, a subscriber unit, a station, a cellular phone, a personal digital assistant, a wireless modem, a wireless communications device, a handheld device, a laptop computer, a cordless telephone set, and a wireless local loop station. The terminal device may communicate with one or more core networks by using a radio access network (radio access network, RAN for short)(an access part of a wireless communications network). For example, the terminal device exchanges voice and/or data with the radio access network.

Figure 6:
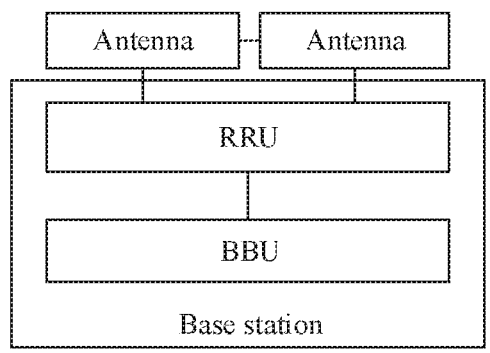
FIG. 6 is a schematic diagram of a hardware architecture of a base station according to an embodiment of this application.

For example, a base station may be implemented by using a structure shown in FIG. 6. FIG. 6 shows a universal hardware architecture of a base station. The base station shown in FIG. 6 may include a building baseband unit (building baseband unit, BBU for short) and a remote radio unit (remote radio unit, RRU for short). The RRU is connected to an antenna feeder system (namely, an antenna), and the BBU and the RRU may be used separately based on needs. It should be noted that in a specific implementation process, the base station may alternatively use another universal hardware architecture, but is not limited to only the universal hardware architecture shown in FIG. 6. In this embodiment of this application, the RRU may send downlink control information and the like to the terminal device by using the antenna feeder system.

Figure 7:
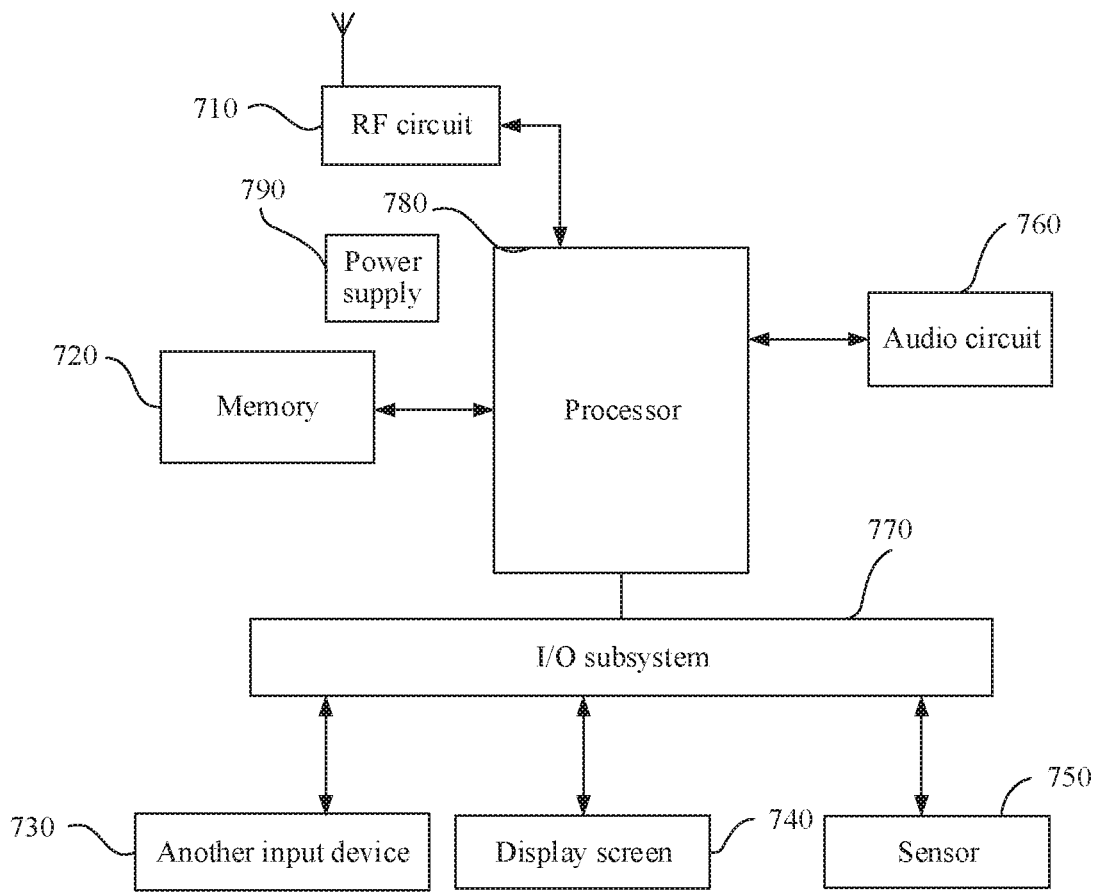
FIG. 7 is a schematic diagram of a hardware architecture of a mobile phone according to an embodiment of this application.

For example, the terminal device may be implemented by using a structure shown in FIG. 7. An example in which the terminal device is a mobile phone is used. FIG. 7 shows a universal hardware architecture of the mobile phone for description. The mobile phone shown in FIG. 7 may include components such as a radio frequency (radio Frequency, RF for short) circuit 710, a memory 720, another input device 730, a display screen 740, a sensor 750, an audio circuit 760, an input/output (Input/Output, I/O for short) subsystem 770, a processor 780, and a power supply 790. A person skilled in the art may understand that a structure of the mobile phone shown in FIG. 7 does not constitute any limitation on the mobile phone, and the mobile phone may include more or fewer components than those shown in the figure, or some components may be combined, or some components may be separated, or different component arrangements may be used. A person skilled in the art may understand that the display screen 740 is a user interface (user interface, UI for short). The display screen 740 may include a display panel and a touch panel. In addition, the mobile phone may include more or fewer components than those shown in the figure. Although not shown, the mobile phone may further include function modules or devices such as a camera and a Bluetooth module, and details are not described herein.

Further, the processor 780 is separately connected to the RF circuit 710, the memory 720, the audio circuit 760, the I/O subsystem 770, and the power supply 790. The I/O subsystem 770 is separately connected to the another input device 730, the display screen 740, and the sensor 750. The RF circuit 710 may be configured to receive and send signals during information receiving and sending or in a call process. Particularly, after receiving downlink information from the base station, the RF circuit 710 sends the downlink information to the processor 780 for processing. For example, in this embodiment of this application, the RF circuit 710 is configured to receive downlink control information and the like sent by the base station. The memory 720 may be configured to store a software program and a module. The processor 780 runs the software program and the module that are stored in the memory 720, to perform various functional applications of the mobile phone and data processing. The another input device 730 may be configured to: receive input digit or character information, and generate signal input related to user settings and function control of the mobile phone. The display screen 740 may be configured to display information input by the user or information provided for the user, and various menus of the mobile phone, and user input may be performed on the display screen 740. The sensor 750 may be an optical sensor, a motion sensor, or another sensor. The audio circuit 760 may provide an audio interface between the user and the mobile phone. The I/O subsystem 770 is configured to control an external input/output device. The external device may include another device input controller, a sensor controller, or a display controller. The processor 780 is a control center of the mobile phone, connects each part of the entire mobile phone by using various interfaces and lines. The processor 780 performs various functions of the mobile phone and processes data by running or executing the software program and/or the module that are/is stored in the memory 720 and invoking data stored in the memory 720, to perform overall monitoring on the mobile phone. The power supply 790 (such as a battery) is configured to supply power to the foregoing components. Preferably, the power supply may be logically connected to the processor 780 by using a power supply management system, thereby implementing functions such as charging, discharging, and power consumption management by using the power supply management system.

Figure 8:
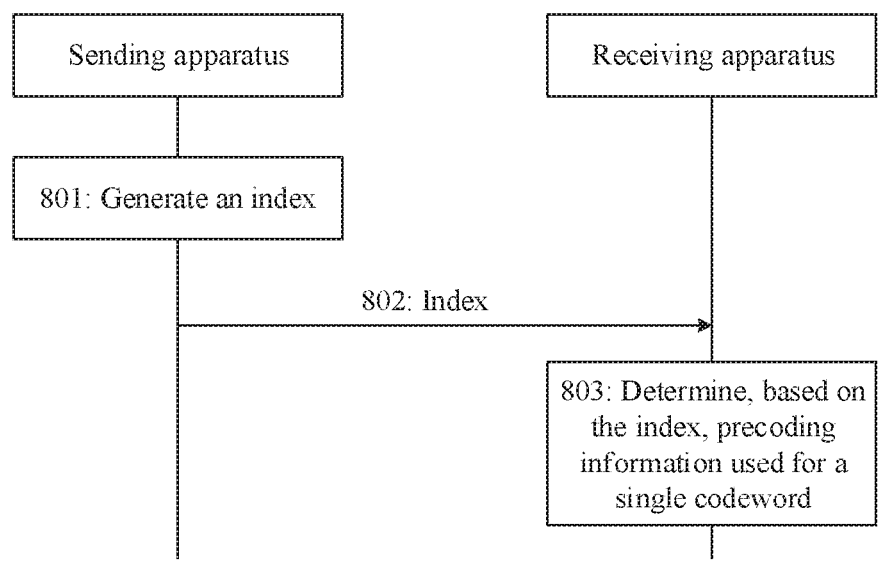
FIG. 8 is an interaction flowchart of a precoding matrix determining method according to an embodiment of this application.

An embodiment of this application further provides an information sending and receiving method. As shown in FIG. 8, the method may include the following steps.

801: A sending apparatus generates an index.

The index indicates precoding information used for a single codeword.

The sending apparatus may be a network device, for example, a base station. A receiving apparatus may be a terminal device, and the terminal device may also be referred to as UE. The following describes the method provided in this embodiment of this application by using an example in which the sending apparatus is the base station and the receiving apparatus is the UE. The index may be represented as an Arabic numeral, may be represented as a binary number (for example, when the index is 16, the index may be represented as a binary number 1111), or may be represented in another manner. This is not specifically limited in this embodiment of this application. It should be noted that, when index information is transmitted between communications devices, to enable two communications ends to identify the index, the index is represented as a binary number. In this embodiment of this application, the method provided in this embodiment of this application is described by using an example in which the index is represented as an Arabic numeral.

802: The sending apparatus sends the index to the receiving apparatus. Correspondingly, the receiving apparatus receives the index from the sending apparatus.

For example, the sending apparatus may add the index to DCI, and send the DCI to the receiving apparatus. Specifically, the index may be added to a precoding information field for sending. Specifically, the sending apparatus may generate the DCI when determining, when downlink transmission is to be performed to the receiving apparatus, precoding information used for downlink data. Specifically, DCI of downlink data may be sent in a DCI format 2, and DCI of uplink data may be sent in a DCI format 4.

803: The receiving apparatus determines, based on the index, the precoding information used for the single codeword.

Specifically, when the receiving apparatus determines the precoding information used for the downlink data, and receives the downlink data, the receiving apparatus demodulates the downlink data based on the precoding information. When the receiving apparatus determines precoding information used for uplink data, the receiving apparatus performs precoding on the uplink data based on the precoding information.

During actual implementation, the sending apparatus and the receiving apparatus may store, in a form of tables, precoding information indicated by indexes when values of the indexes are different. Such tables may be predefined tables.

Optionally, the single codeword is a codeword sent by the sending apparatus to the receiving apparatus, and there are two antenna ports of the sending apparatus; or the single codeword is a codeword sent by the receiving apparatus to the sending apparatus, and there are two antenna ports of the receiving apparatus; and a quantity of values of indexes is less than or equal to 4.

In this case, when the single codeword is the codeword sent by the sending apparatus to the receiving apparatus, and there are two antenna ports of the sending apparatus, for a correspondence between the index and the precoding information, refer to the following Table 15-1 or Table 15-2. When the single codeword is the codeword sent by the receiving apparatus to the sending apparatus, and there are two antenna ports of the receiving apparatus, for a correspondence between the index and the precoding information, refer to the following Table 19-2 or Table 20.

Optionally, the single codeword is a codeword sent by the sending apparatus to the receiving apparatus, and there are four antenna ports of the sending apparatus; or the single codeword is a codeword sent by the receiving apparatus to the sending apparatus, and there are four antenna ports of the receiving apparatus; and a quantity of values of indexes is less than or equal to 32.

In this case, when the single codeword is the codeword sent by the sending apparatus to the receiving apparatus, and there are four antenna ports of the sending apparatus, for a correspondence between the index and the precoding information, refer to any one of the following Table 17-1 to Table 17-4 and Table 18-1 to Table 18-4. When the single codeword is the codeword sent by the receiving apparatus to the sending apparatus, and there are four antenna ports of the receiving apparatus, for a correspondence between the index and the precoding information, refer to the following Table 22.

Optionally, the single codeword is a codeword sent by the sending apparatus to the receiving apparatus, and there are two antenna ports of the sending apparatus; or the single codeword is a codeword sent by the receiving apparatus to the sending apparatus, and there are two antenna ports of the receiving apparatus; and there are two columns in a precoding matrix corresponding to precoding information indicated by an index corresponding to at least one of values of indexes.

In this case, when the single codeword is the codeword sent by the sending apparatus to the receiving apparatus, and there are two antenna ports of the sending apparatus, for a correspondence between the index and the precoding information, refer to the following Table 14 or Table 15-1. When the single codeword is the codeword sent by the receiving apparatus to the sending apparatus, and there are two antenna ports of the receiving apparatus, for a correspondence between the index and the precoding information, refer to the following Table 19-1 or Table 20. The single codeword may be an initially transmitted codeword.

Optionally, the single codeword is a codeword sent by the sending apparatus to the receiving apparatus, and there are four antenna ports of the sending apparatus; or the single codeword is a codeword sent by the receiving apparatus to the sending apparatus, and there are four antenna ports of the receiving apparatus; and there are three or four columns in a precoding matrix corresponding to precoding information indicated by an index corresponding to at least one of values of indexes.

In this case, when the single codeword is the codeword sent by the sending apparatus to the receiving apparatus, and there are four antenna ports of the sending apparatus, for a correspondence between the index and the precoding information, refer to any one of the following Table 16-1 and Table 16-2, Table 17-1 to Table 17-4, and Table 18-1 to Table 18-4. When the single codeword is the codeword sent by the receiving apparatus to the sending apparatus, and there are four antenna ports of the receiving apparatus, for a correspondence between the index and the precoding information, refer to the following Table 21. The single codeword may be an initially transmitted codeword.

The following specifically describes correspondences between indexes and precoding information in different cases during downlink transmission.

Case 1: The sending apparatus and the receiving apparatus support a maximum of two antenna ports.

In this case, the sending apparatus may indicate the index by using 3 bits or 2 bits, which are separately described as follows.

(1) The index is indicated by using 3 bits.

In a possible implementation, the single codeword is the codeword sent by the sending apparatus to the receiving apparatus, and there are two antenna ports of the sending apparatus; and all values of indexes include the following eight types of precoding information.

The first type of precoding information is a 2-layer transmit diversity.

The second type of precoding information is that there is one transport layer for transmitting the single codeword, and a precoding matrix is $[1\ 1]^T/\sqrt{2}$.

The third type of precoding information is that there is one transport layer for transmitting the single codeword, and a precoding matrix is $[1\ -1]^T/\sqrt{2}$.

The fourth type of precoding information is that there is one transport layer for transmitting the single codeword, and a precoding matrix is $[1\ j]^T/\sqrt{2}$.

The fifth type of precoding information is that there is one transport layer for transmitting the single codeword, and a precoding matrix is $[1\ -j]^T/\sqrt{2}$.

The sixth type of precoding information is that there are two transport layers for transmitting the single codeword, and a precoding matrix is $$\frac{1}{2}\begin{bmatrix} 1 & 1 \\ 1 & -1 \end{bmatrix}.$$

The seventh type of precoding information is that there are two transport layers for transmitting the single codeword, and a precoding matrix is $$\frac{1}{2}\begin{bmatrix} 1 & 1 \\ j & -j \end{bmatrix}.$$

The eighth type of precoding information is that a precoding matrix is a precoding matrix reported by a latest PMI carried on a PUSCH.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the fifth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

The sixth type and the seventh type of precoding information are corresponding to codebook-based precoding. The sending apparatus may allocate, based on the PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there are two transport layers for transmitting each single codeword, and compared with a case in which there is one transport layer, more data can be transmitted when there are two transport layers.

Because the PMI reported by the receiving apparatus is used for the eighth type of precoding information, compared with the second type to the seventh type of precoding information, the eighth type of precoding information may allow different precoding for different frequency bands (on the premise that PMIs reported by UE are different). In this way, a precoding matrix used by the sending apparatus is more adaptive to a channel, and more received signal energy is increased, thereby improving a received signal-to-noise ratio and data transmission reliability.

In the possible implementation, for the correspondence between the index and the precoding information, refer to Table 14.

TABLE 14

| 2-antenna port precoding information, 3 bits | |
|---|---|
| Index (Index) | Information (Message) |
| 0 | Two layers: transmit diversity |
| 1 | One layer: precoding vector $[1\ 1]^T/\sqrt{2}$ |
| 2 | One layer: precoding vector $[1\ -1]^T/\sqrt{2}$ |
| 3 | One layer: precoding vector $[1\ j]^T/\sqrt{2}$ |
| 4 | One layer: precoding vector $[1\ -j]^T/\sqrt{2}$ |
| 5 | Two layers: precoding matrix $\frac{1}{2}\begin{bmatrix} 1 & 1 \\ 1 & -1 \end{bmatrix}$ |

TABLE 14-continued 2-antenna port precoding information, 3 bits

| Index (Index) | Information (Message) |
|---|---|
| 6 | Two layers: precoding matrix $\frac{1}{2}\begin{bmatrix} 1 & 1 \\ j & -j \end{bmatrix}$ |

In Table 14, two columns in Table 9 are actually combined into one column. In addition, to maintain that the index is indicated by using 3 bits, original three solutions in which precoding is determined based on the reported PMI are combined into one solution. An advantage of this solution is that when the base station can schedule only one codeword for the terminal device, the base station can still serve the terminal device by using 2-layer precoding, flexibility of selecting precoding is not reduced, transmission efficiency of a system can be maintained, and DCI overheads remain unchanged.

It should be noted that a precoding matrix corresponding to precoding information indicated by an index 7 may have one column, or may have two columns. For example, if the precoding matrix corresponding to the precoding information indicated by the index 7 has one column, the precoding matrix may be a precoding matrix corresponding to precoding information indicated by an index 5 or an index 6 in the left column in Table 9. If the precoding matrix corresponding to the precoding information indicated by the index 7 has two columns, the precoding matrix may be a precoding matrix corresponding to precoding information indicated by an index 2 in the right column in Table 9.

(2) The index is indicated by using 2 bits.

In this case, a maximum of four types of precoding information may be configured, so that an index is notified only by using no more than 2 bits, a quantity of bits of DCI is reduced, redundant information during PDCCH transmission is increased, and reliability of the DCI is improved.

In a first possible implementation, for the correspondence between the index and the precoding information, refer to Table 15-1.

TABLE 15-1

2-antenna port precoding information, 2 bits

| Index (Index) | Information (Message) |
|---|---|
| 0 | Two layers: transmit diversity |
| 1 | Two layers: precoding matrix $\frac{1}{2}\begin{bmatrix} 1 & 1 \\ 1 & -1 \end{bmatrix}$ |
| 2 | Two layers: precoding matrix $\frac{1}{2}\begin{bmatrix} 1 & 1 \\ j & -j \end{bmatrix}$ |
| 3 | Precoding reported by a latest PMI carried on a PUSCH is used as a precoding matrix |

Compared with Table 14, Table 15-1 is mainly oriented to UE that has relatively good channel quality and that usually uses 2-layer transmission. Therefore, in Table 15-1, all indexes for the 2-layer transmission in Table 14 and a 2-layer transmit diversity (although referred to as the 2-layer transmit diversity, it can be learned from Table 9 that this solution actually belongs to 1-layer transmission) are reserved, and other indexes for the 1-layer transmission are deleted. When the channel quality of the UE is suddenly and severely reduced, the terminal device may still be served by using the 2-layer transmit diversity, and a case in which due to a modification of a table, a terminal device that originally can be served in some scenarios cannot be served after a new table is used is avoided.

It should be noted that a precoding matrix corresponding to precoding information indicated by an index 3 may have one column, or may have two columns. For example, if the precoding matrix corresponding to the precoding information indicated by the index 3 has one column, the precoding matrix may be a precoding matrix corresponding to precoding information indicated by an index 5 or an index 6 in the left column in Table 9. If the precoding matrix corresponding to the precoding information indicated by the index 3 has two columns, the precoding matrix may be a precoding matrix corresponding to precoding information indicated by an index 2 in the right column in Table 9.

In a second possible implementation, the single codeword is the codeword sent by the sending apparatus to the receiving apparatus, and there are two antenna ports of the sending apparatus; and precoding information indicated by all values of indexes is the following four types of precoding information, precoding information indicated by all values of indexes includes at least two types of the following four types of precoding information, or precoding information indicated by all values of indexes includes the first type and the fourth type of the following four types of precoding information.

The first type of precoding information is a 2-layer transmit diversity.

The second type of precoding information is that there is one transport layer for transmitting the single codeword, and a precoding matrix is $[1\ 1]^T/\sqrt{2}$.

The third type of precoding information is that there is one transport layer for transmitting the single codeword, and a precoding matrix is $[1\ -1]^T/\sqrt{2}$.

The fourth type of precoding information is a precoding matrix reported by a latest precoding matrix indication PMI carried on a physical uplink shared channel PUSCH.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type and the third type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

Because the PMI reported by the receiving apparatus is used for the fourth type of precoding information, compared with the second type and the third type of precoding information, the fourth type of precoding information may allow different precoding for different frequency bands (on the premise that PMIs reported by UE are different). In this way, a precoding matrix used by the sending apparatus is more adaptive to a channel, and more received signal energy is increased, thereby improving a received signal-to-noise ratio and data transmission reliability.

In this case, for the correspondence between the index and the precoding information, refer to Table 15-2.

TABLE 15-2

| 2-antenna port precoding information, 2 bits | |
|---|---|
| Index (Index) | Information (Message) |
| 0 | Two layers: transmit diversity |
| 1 | One layer: precoding matrix $[1\ 1]^T/\sqrt{2}$ |
| 2 | One layer: precoding matrix $[1\ -1]^T/\sqrt{2}$ |
| 3 | Precoding reported by a latest PMI carried on a PUSCH is used as a precoding matrix |

In a third possible implementation, the single codeword is the codeword sent by the sending apparatus to the receiving apparatus, and there are two antenna ports of the sending apparatus; and precoding information indicated by all values of indexes is the following four types of precoding information, precoding information indicated by all values of indexes includes at least two types of the following four types of precoding information, or precoding information indicated by all values of indexes includes the first type and the fourth type of the following four types of precoding information.

The first type of precoding information is a 2-layer transmit diversity.

The second type of precoding information is that there is one transport layer for transmitting the single codeword, and a precoding matrix is $[1\ j]^T/\sqrt{2}$.

The third type of precoding information is that there is one transport layer for transmitting the single codeword, and a precoding matrix is $[1\ -j]^T/\sqrt{2}$.

The fourth type of precoding information is a precoding matrix reported by a latest PMI carried on a PUSCH.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type and the third type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

Because the PMI reported by the receiving apparatus is used for the fourth type of precoding information, compared with the second type and the third type of precoding information, the fourth type of precoding information may allow different precoding for different frequency bands (on the premise that PMIs reported by UE are different). In this way, a precoding matrix used by the sending apparatus is more adaptive to a channel, and more received signal energy is increased, thereby improving a received signal-to-noise ratio and data transmission reliability.

In this case, for the correspondence between the index and the precoding information, refer to Table 15-3.

TABLE 15-3

| 2-antenna port precoding information, 2 bits | |
|---|---|
| Index (Index) | Information (Message) |
| 0 | Two layers: transmit diversity |
| 1 | One layer precoding matrix $[1\ j]^T/\sqrt{2}$ |
| 2 | One layer: precoding matrix $[1\ -j]^T/\sqrt{2}$ |
| 3 | Precoding reported by a latest PMI carried on a PUSCH is used as a precoding matrix |

Case 2 The sending apparatus and the receiving apparatus support a maximum of four antenna ports.

In this case, the sending apparatus may indicate the index by using 6 bits, 5 bits, or 4 bits, which are separately described as follows.

(1) The index is indicated by using 6 bits.

In a possible implementation, for the correspondence between the index and the preceding information, refer to Table 16-1.

TABLE 16-1

| 4-antenna port precoding information, 6 bits | |
|---|---|
| Index (Index) | Information (Message) |
| 0 | Four layers: transmit diversity |
| 1 | One layer: TPMI = a0 |
| 2 | One layer: TPMI = a1 |
| . | . |
| . | . |
| . | . |
| 8 | One layer: TPMI = a7 |
| 9 | One layer: precoding reported by a latest PMI carried on a PUSCH is used as a precoding matrix |
| 10 | Two layers: TPMI = 0 |
| 11 | Two layers: TPMI = 1 |
| . | . |
| . | . |
| 25 | Two layers: TPMI = 15 |
| 26 | Two layers: precoding reported by the latest PMI carried on the PUSCH is used as a precoding matrix |
| 27 | Three layers: TPMI = 0 |
| 28 | Three layers: TPMI = 1 |
| . | . |
| . | . |
| 42 | Three layers: TPMI = 15 |
| 43 | Three layers: precoding reported by the latest PMI carried on the PUSCH is used as a precoding matrix |
| 44 | Four layers: TPMI = 0 |
| 45 | Four layers: TPMI = 1 |
| . | . |
| . | . |
| 59 | Four layers: TPMI = 15 |
| 60 | Four layers: precoding reported by the latest PMI carried on the PUSCH is used as a precoding matrix | a0 to a7 are integers that range from 0 to 15, and are different from each other. For example, a0=0, a1=1, . . . , and a7=7.

In Table 16-1, two columns in Table 10 are actually combined into one column (there are 69 indexes after combination). In addition, to maintain that the index is indicated by using 6 bits, a total of 16 types of precoding (corresponding to TPMIs 0 to 15) during original 1-layer transmission are reduced to eight types, and specific reduced eight types are not limited in this application. An advantage of this solution is that when the base station can schedule only one codeword for the terminal device, the base station can still serve the terminal device by using 4-layer precoding, flexibility of selecting precoding is not reduced, transmission efficiency of a system can be maintained, and DCI overheads remain unchanged.

It should be noted that an indication range of indication information in Table 16-1 includes at least the foregoing 61 solutions, and may further include another solution. This is not limited in this application. To be specific, in Table 16-1, an example in which N=61 is used for drawing. During actual implementation, N may be greater than 61. A specific value is not specifically limited in this embodiment of this application.

In another possible implementation, the single codeword is the codeword sent by the sending apparatus to the receiving apparatus, and there are four antenna ports of the sending apparatus; and all values of indexes include the following 61 types of precoding information.

The first type of precoding information is a 4-layer transmit diversity.

An $i^{th}$ type of precoding information is that there is one transport layer for transmitting the single codeword, a precoding matrix is a precoding matrix represented by a TPMI, the TPMI=i−2, and i is an integer greater than or equal to 2 and less than or equal to 17.

The eighteenth type of precoding information is that there is one transport layer for transmitting the single codeword, and a precoding matrix is a precoding matrix reported by a latest PMI carried on a PUSCH.

A $j^{th}$ type of precoding information is that there are two transport layers for transmitting the single codeword, and a precoding matrix is a precoding matrix represented by a TPMI, the TPMI=j−19, and j is an integer greater than or equal to 19 and less than or equal to 34.

The thirty-fifth type of precoding information is that there are two transport layers for transmitting the single codeword, and a precoding matrix is a precoding matrix reported by the latest PMI carried on the PUSCH.

A $k^{th}$ type of precoding information is that there are three transport layers for transmitting the single codeword, a precoding matrix is a precoding matrix represented by a TPMI, the TPMI=k−36, and k is an integer greater than or equal to 36 and less than or equal to 51.

The fifty-second type of precoding information is that there are three transport layers for transmitting the single codeword, and a precoding matrix is a precoding matrix reported by the latest PMI carried on the PUSCH.

A $g^{th}$ type of precoding information is that there are four transport layers for transmitting the single codeword, a precoding matrix is a precoding matrix represented by a TPMI, the TPMI=a(g−53), and g is an integer greater than or equal to 53 and less than or equal to 60, where a0, a1, . . . , a6, and a7 are seven different values in 0, 1, . . . , 14, and 15.

The sixty-first type of precoding information is that there are four transport layers for transmitting the single codeword, and a precoding matrix is a precoding matrix reported by the latest PMI carried on the PUSCH.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the seventeenth type, the nineteenth type to the thirty-fourth type, the thirty-sixth type to the fifty-first type, and the fifty-third type to the sixtieth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there are one to four transport layers for transmitting the single codeword, and a quantity of layers required for various transmission rates may be supported through maximum flexibility.

Because the PMI reported by the receiving apparatus is used for the eighteenth type, the thirty-fifth type, the fifty-second type, and the sixty-first type of precoding information, compared with the second type to the sixty-first type of precoding information, the eighteenth type, the thirty-fifth type, the fifty-second type, andthesixty-firsttypeofpreodinginformationmayallowdifferentprecodingfor different frequency bands (on the premise that PMIs reported by the receiving apparatus are different). In this was a precoding matrix used by the sending apparatus is more adaptive to a channel, and more received signal energy is increased, thereby improving a received signal-to-noise ratio and data transmission reliability.

In the possible implementation, for the correspondence between the index and the precoding information, refer to Table 16-2. In Table 16-2, an example n which N=61 is used for drawing.

TABLE 16-2

4-antenna port precoding information, 6 bits

| Index (Index) | Information (Message) |
|---|---|
| 0 | Four layers: transmit diversity |
| 1 | One layer: TPMI = 0 |
| 2 | One layer: TPMI = 1 |
| . | . |
| . | . |
| . | . |
| 16 | One layer: TPMI = 15 |
| 17 | One layer: precoding reported by a latest PMI carried on a PUSCH is used as a precoding matrix |
| 18 | Two layers: TPMI = 0 |
| 19 | Two layers: TPMI = 1 |
| . | . |
| . | . |
| . | . |
| 33 | Two layers: TPMI = 15 |
| 34 | Two layers: precoding reported by the latest PMI carried on the PUSCH is used as a precoding matrix |
| 35 | Three layers: TPMI = 0 |
| 36 | Three layers: TPMI = 1 |
| . | . |
| . | . |
| . | . |

TABLE 16-2-continued 4-antenna port precoding information, 6 bits

| Index (Index) | Information (Message) |
|---|---|
| 50 | Three layers: TPMI = 15 |
| 51 | Three layers: precoding reported by the latest PMI carried on the PUSCH is used as a preceding matrix |
| 52 | Four layers: TPMI = a0 |
| 53 | Four layers: TPMI = a1 |
| . | . |
| . | . |
| . | . |
| 59 | Four layers: TPMI = a7 |
| 60 | Four layers: preceding reported by the latest PMI carried on the PUSCH is used as a preceding matrix |

An only difference between Table 16-2 and Table 16-1 is that in Table 16-2, deleted eight types of TPMIs are from 4-layer transmission. Therefore, beneficial effects of this table are the same as those of Table 16-1.

Usually, Table 16-1 is applicable to UE that has relatively good channel quality. On the contrary, Table 16-2 is applicable to UE that has relatively poor channel quality. The two tables have covered all possible cases for UE.

(2) The index is indicated by using 5 bits.

In this case, a maximum of 32 types of precoding information may be configured, so that an index is notified only by using no more than 5 bits, a quantity of bits of DCI is reduced, redundant information during PDCCH transmission is increased, and reliability of the DCI is improved.

In a possible implementation, the single codeword is the codeword sent by the sending apparatus to the receiving apparatus, and there are four antenna ports of the sending apparatus; and precoding information indicated by all values of indexes includes the following 21 types of precoding information, precoding information indicated by all values of indexes includes at least 18 types of the following 21 types of precoding information, or precoding information indicated by all values of indexes includes the first type to the eighteenth type of the following 21 types of precoding information.

The first type of precoding information is a 4-layer transmit diversity.

An $i^{th}$ type of precoding information is that there is one transport layer for transmitting the single codeword, a precoding matrix is a precoding matrix represented by a transmit precoding matrix indication TPMI, the TPMI=i−2, and i is an integer greater than or equal to 2 and less than or equal to 17.

The eighteenth type of precoding information is that there is one transport layer for transmitting the single codeword, and a precoding matrix is a precoding matrix reported by a latest PMI carried on a PUSCH.

The nineteenth type of precoding information is that there are two transport layers for transmitting the single codeword, and a precoding matrix is a precoding matrix reported by the latest PMI carried on the PUSCH.

The twentieth type of precoding information is that there are three transport layers for transmitting the single codeword, and a precoding matrix is a precoding matrix reported by the latest PMI carried on the PUSCH.

The twenty-first type of precoding information is that there are four transport layers for transmitting the single codeword, and a precoding matrix is a precoding matrix reported by the latest PMI carried on the PUSCH.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the seventeenth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

Because the PMI reported by the receiving apparatus is used for the eighteenth type to the twenty-first type of precoding information, compared with the second type to the seventeenth type of precoding information, the eighteenth type to the twenty-first type of precoding information may allow different precoding for different frequency bands (on the premise that PMIs reported by the receiving apparatus are different). In this a precoding matrix used by the sending apparatus is more adaptive to a channel, and more received signal energy is increased, thereby improving a received signal-to-noise ratio and data transmission reliability.

In the possible implementation, for the correspondence between the index and the precoding information, refer to Table 17-1. In Table 17-1, an example in which N=21 is used for drawing.

TABLE 17-1

4-antenna port precoding information, 5 bits

| Index (Index) | Information (Message) |
|---|---|
| 0 | Four layers: transmit diversity |
| 1 | One layer: TPMI = 0 |
| 2 | One layer: TPMI = 1 |
| . | . |
| . | . |
| . | . |
| 16 | One layer: TPMI = 15 |
| 17 | One layer: precoding reported by a latest PMI carried on a PUSCH is used as a precoding matrix |
| 18 | Two layers: precoding reported by the latest PMI carried on the PUSCH is used as a preceding matrix |
| 19 | Three layers: precoding reported by the latest PMI carried on the PUSCH is used as a preceding matrix |
| 20 | Four layers: precoding reported by the latest PMI carried on the PUSCH is used as a preceding matrix |

In another possible implementation, for the correspondence between the index and the precoding information, refer to Table 17-2, Table 17-3, or Table 174.

TABLE 17-2

4-antenna port precoding information, 5 bits

| Index (Index) | Information (Message) |
|---|---|
| 0 | Four layers: transmit diversity |
| 1 | One layer: precoding reported by a latest PMI carried on a PUSCH is used as a precoding matrix |
| 2 | Two layers: TPMI = 0 |
| 3 | Two layers: TPMI = 1 |
| . | . |
| . | . |
| . | . |
| 17 | Two layers: TPMI = 15 |
| 18 | Two layers: precoding reported by the latest PMI carried on the PUSCH is used as a precoding matrix |
| 19 | Three layers: precoding reported by the latest PMI carried on the PUSCH is used as a precoding matrix |
| 20 | Four layers: precoding reported by the latest PMI carried on the PUSCH is used as a precoding matrix |

TABLE 17-3

4-antenna port precoding information, 5 bits

| Index (Index) | Information (Message) |
|---|---|
| 0 | Four layers: transmit diversity |
| 1 | One layer: precoding reported by a latest PMI carried on a PUSCH is used as a precoding matrix |
| 2 | Two layers: precoding reported by the latest PMI carried on the PUSCH is used as a precoding matrix |
| 3 | Three layers: TPMI = 0 |
| 4 | Three layers: TPMI = 1 |
| . | . |
| . | . |
| . | . |
| 18 | Three layers: TPMI = 15 |
| 19 | Three layers: precoding reported by the latest PMI carried on the PUSCH is used as a precoding matrix |
| 20 | Four layers: precoding reported by the latest PMI carried on the PUSCH is used as a precoding matrix |

TABLE 17-4

4-antenna port precoding information, 5 bits

| Index (Index) | Information (Message) |
|---|---|
| 0 | Four layers: transmit diversity |
| 1 | One layer: precoding reported by a latest PMI carried on a PUSCH is used as a precoding matrix |
| 2 | Two layers: precoding reported by the latest PMI carried on the PUSCH is used as a precoding matrix |
| 3 | Three layers: precoding reported by the latest PMI carried on the PUSCH is used as a precoding matrix |
| 4 | Four layers: TPMI = 0 |
| 5 | Four layers: TPMI = 1 |
| . | . |
| . | . |
| . | . |
| 19 | Four layers: TPMI = 15 |
| 20 | Four layers: precoding reported by the latest PMI carried on the PUSCH is used as a precoding matrix |

In each of Table 17-1 to Table 17-4, a total of five indexes, namely, a transmit diversity and precoding corresponding to PMIs for one layer, two layers, three layers, and four layers are permanently reserved. In addition, all 16 types of TPMIs during transmission at a particular layer are reserved. Therefore, each table has a total of 5+16=21 types of indexes.

In Table 17-2 to Table 17-4, an example in which N=21 is used for drawing. During actual implementation, N may be greater than 21. A specific value is not specifically limited in this embodiment of this application.

(3) The index is indicated by using 4 bits.

In this case, a maximum of 16 types of precoding information may be configured, so that an index is notified only by using no more than 4 bits, a quantity of bits of DCI is reduced, redundant information during PDCCH transmission is increased, and reliability of the DCI is improved.

In a possible implementation, the single codeword is a codeword sent by the sending apparatus to the receiving apparatus, and there are four antenna ports of the sending apparatus; and precoding information indicated by all values of indexes includes the following 13 types of precoding information, precoding information indicated by all values of indexes includes at least 10 types of the following 13 types of precoding information, or precoding information indicated by all values of indexes includes the first type to the tenth type of the following 13 types of precoding information.

The first type of precoding information is a 4-layer transmit diversity.

An $i^{th}$ type of precoding information is that there is one transport layer for transmitting the single codeword, a precoding matrix is a precoding matrix represented by a TPMI, the TPMI=a(i−2), and i is an integer greater than or equal to 2 and less than or equal to 9, where a0, a1, . . . , a6, and a7 are seven different values in 0, 1, . . . , 14, and 15.

The tenth type of precoding information is that there is one transport layer for transmitting the single codeword, and a precoding matrix is a precoding matrix reported by a latest PMI carried on a PUSCH.

The eleventh type of precoding information is that there are two transport layers for transmitting the single codeword, and a precoding matrix is a precoding matrix reported by the latest PMI carried on the PUSCH.

The twelfth type of precoding information is that there are three transport layers for transmitting the single codeword, and a precoding matrix is a precoding matrix reported by the latest PMI carried on the PUSCH.

The thirteenth type of precoding information is that there are four transport layers for transmitting the single codeword, and a precoding matrix is a precoding matrix reported by the latest PMI carried on the PUSCH.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the ninth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the receiving apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

Because the PMI reported by the receiving apparatus is used for the tenth type to the thirteenth type of precoding information, compared with the second type to the ninth type of precoding information, the tenth type to the thirteenth type of precoding information may allow different precoding for different frequency bands (on the premise that PMIs reported by the receiving apparatus are different). In this way, a precoding matrix used by the sending apparatus is more adaptive to a channel, and more received signal energy is increased, thereby improving a received signal-to-noise ratio and data transmission reliability.

In the possible implementation, for the correspondence between the index and the precoding information, refer to Table 18-1. In Table 18-1, an example in which N=13 is used for drawing.

TABLE 18-1

4-antenna port precoding information, 4 bits

| Index (Index) | Information (Message) |
|---|---|
| 0 | Four layers: transmit diversity |
| 1 | One layer: TPMI = a0 |
| 2 | One layer: TPMI = a1 |
| . | . |
| . | . |
| . | . |
| 8 | One layer: TPMI = a7 |
| 9 | One layer: precoding reported by a latest PMI carried on a PUSCH is used as a precoding matrix |
| 10 | Two layers: precoding reported by the latest PMI carried on the PUSCH is used as a precoding matrix |
| 11 | Three layers: precoding reported by the latest PMI carried on the PUSCH is used as a precoding matrix |
| 12 | Four layers: precoding reported by the latest PMI carried on the PUSCH is used as a precoding matrix |

In another possible implementation, for the correspondence between the index and the precoding information, refer to Table 18-2, Table 18-3, or Table 184.

TABLE 18-2

4-antenna port precoding information, 4 bits

| Index (Index) | Information (Message) |
|---|---|
| 0 | Four layers: transmit diversity |
| 1 | One layer: precoding reported by a latest PMI carried on a PUSCH is used as a precoding matrix |
| 2 | Two layers: TPMI = a0 |
| 3 | Two layers: TPMI = a1 |
| . | . |
| . | . |
| . | . |
| 9 | Two layers: TPMI = a7 |
| 10 | Two layers: precoding reported by the latest PMI carried on the PUSCH is used as a precoding matrix |
| 11 | Three layers: precoding reported by the latest PMI carried on the PUSCH is used as a precoding matrix |

TABLE 18-2-continued 4-antenna port precoding information, 4 bits

| Index (Index) | Information (Message) |
|---|---|
| 12 | Four layers: precoding reported by the latest PMI carried on the PUSCH is used as a precoding matrix |

TABLE 18-3

4-antenna port precoding information, 4 bits

| Index (Index) | Information (Message) |
|---|---|
| 0 | Four layers: transmit diversity |
| 1 | One layer: precoding reported by a latest PMI carried on a PUSCH is used as a precoding matrix |
| 2 | Two layers: precoding reported by the latest PMI carried on the PUSCH is used as a precoding matrix |
| 3 | Three layers: TPMI = a0 |
| 4 | Three layers: TPMI = a1 |
| . | . |
| . | . |
| . | . |
| 10 | Three layers: TPMI = a7 |
| 11 | Three layers: precoding reported by the latest PMI carried on the PUSCH is used as a precoding matrix |
| 12 | Four layers: precoding reported by the latest PMI carried on the PUSCH is used as a precoding matrix |

TABLE 18-4

4-antenna port precoding information, 4 bits

| Index (Index) | Information (Message) |
|---|---|
| 0 | Four layers: transmit diversity |
| 1 | One layer: precoding reported by a latest PMI carried on a PUSCH is used as a precoding matrix |
| 2 | Two layers: precoding reported by the latest PMI carried on the PUSCH is used as a precoding matrix |
| 3 | Three layers: preceding reported by the latest PMI carried on the PUSCH is used as a precoding matrix |
| 4 | Four layers: TPMI = a0 |
| 5 | Four layers: TPMI = a1 |
| . | . |
| . | . |
| . | . |
| 11 | Four layers: TPMI = a7 |
| 12 | Four layers: precoding reported by the latest PMI carried on the PUSCH is used as a precoding matrix |

In each of Table 18-1 to Table 18-4, for values of a0 to a7, refer to the foregoing descriptions. A total of five indexes, namely, a transmit diversity and precoding corresponding to PMIs for one layer, two layers, three layers, and four layers are permanently reserved. In addition, eight types of TPMIs during transmission at a particular layer are reserved. Therefore, each table has a total of 5+8=13 types of indexes. In Table 18-2 to Table 18-4, an example in which N=13 is used for drawing. During actual implementation, N may be greater than 13. A specific value is not specifically limited in this embodiment of this application. The following specifically describes correspondences between indexes and preceding information in different cases during uplink transmission.

Case 1: The sending apparatus and the receiving apparatus support a maximum of two antenna ports.

(1) The index is indicated by using 3 bits.

In a possible implementation, the single codeword is a codeword sent by the receiving apparatus to the sending apparatus, and there are two antenna ports of the receiving apparatus; and all values of indexes include the following eight types of precoding information.

The first type of precoding information is a 2-layer transmit diversity.

An $i^{th}$ type of precoding information is that there is one transport layer for transmitting the single codeword, a precoding matrix is a precoding matrix represented by a TPMI, the TPMI=i−2, and i is an integer greater than 2 and less than or equal to 7.

The eighth type of precoding information is that there are two transport layers for transmitting the single codeword, a precoding matrix is a precoding matrix represented by a TPMI, and the TPMI=0.

The first type of precoding information may enable the receiving apparatus to redundantly send, when the receiving apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the seventh type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

The eighth type of precoding information is corresponding to codebook-based precoding. The sending apparatus may allocate, based on the PMI reported by the receiving apparatus, precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there are two transport layers for transmitting each single codeword, and compared with a case in which there is one transport layer, more data can be transmitted when there are two transport layers.

In the possible implementation, the index may be indicated by using 3 bits. For the correspondence between the index and the precoding information, refer to Table 19-1. In Table 19-1, an example in which N=8 is used for drawing.

TABLE 19-1

| 2-antenna port precoding information, 3 bits | |
| --- | --- |
| Index (Index) | Information (Message) |
| 0 | Two layers: transmit diversity |
| 1 | One layer: TPMI = 0 |

TABLE 19-1-continued

| 2-antenna port precoding information, 3 bits | |
| --- | --- |
| Index (Index) | Information (Message) |
| 2 | One layer: TPMI = 1 |
| 3 | One layer: TPMI = 2 |
| . | . |
| . | . |
| . | . |
| 6 | One layer: TPMI = 5 |
| 7 | Two layers: TPMI = 0 |

In the possible implementation, when the receiving apparatus sends only one codeword to the sending apparatus, the receiving apparatus can still send data by using 2-layer precoding, flexibility of selecting precoding is not reduced, and transmission efficiency of a system can be maintained. In addition, when N=8, DCI overheads remain unchanged.

(2) The index is indicated by using 2 bits.

In this case, a maximum of four types of precoding information may be configured, so that an index is notified only by using no more than 2 bits, a quantity of bits of DCI is reduced, redundant information during PDCCH transmission is increased, and reliability of the DCI is improved.

Optionally, the single codeword is the codeword sent by the receiving apparatus to the sending apparatus, and there are two antenna ports of the receiving apparatus; and precoding information indicated by all values of indexes is the following four types of precoding information, or precoding information indicated by all values of indexes includes at least two types of the following four types of precoding information.

The first type of precoding information is a 2-layer transmit diversity.

The second type of precoding information is that there is one transport layer for transmitting the single codeword, and a precoding matrix is $[1\ 1]^T/\sqrt{2}$.

The third type of precoding information is that there is one transport layer for transmitting the single codeword, and a precoding matrix is $[1\ 0]^T/\sqrt{2}$.

The fourth type of precoding information is that there is one transport layer for transmitting the single codeword, and a precoding matrix is $[0\ 1]^T/\sqrt{2}$.

The first type of precoding information may enable the receiving apparatus to redundantly send, when the receiving apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the fourth type of precoding information are corresponding to codebook-based precoding. The sending apparatus allocates precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer. For the third type and the fourth type of precoding information, only one transmit antenna port is used to send data, so that energy of the receiving apparatus is saved.

In this case, for the correspondence between the index and the precoding information, refer to Table 19-2.

TABLE 19-2

2-antenna port precoding information, 2 bits

| Index (Index) | Information (Message) |
|---|---|
| 0 | Two layers: transmit diversity |
| 1 | One layer: precoding matrix $[1\ 1]^T/\sqrt{2}$ |
| 2 | One layer: precoding matrix $[1\ 0]^T/\sqrt{2}$ |
| 3 | One layer: precoding matrix $[0\ 1]^T/\sqrt{2}$ |

(3) The index is indicated by using 1 bit.

In this case, a maximum of two types of precoding information may be configured, so that an index is notified only by using no more than 1 bit, a quantity of bits of DCI is reduced, redundant information during PDCCH transmission is increased, and reliability of the DCI is improved.

In this case, for the correspondence between the index and the precoding information, refer to Table 20.

TABLE 20

2-antenna port precoding information, 1 bit

| Index (Index) | Information (Message) |
|---|---|
| 0 | Two layers: transmit diversity |
| 1 | One layer: TPMI = 0 |

Similar to Table 15-1, a majority of 1-layer indexes are deleted, and beneficial effects are also similar to those of Table 15-1.

In Table 20, an example in which N=2 is used for drawing. During actual implementation, N may be greater than 2. A specific value is not specifically limited in this embodiment of this application.

Case 2: The sending apparatus and the receiving apparatus support a maximum of four antenna ports.

(1) The index is indicated by using 6 bits.

In a possible implementation, the single codeword is the codeword sent by the receiving apparatus to the sending apparatus, and there are four antenna ports of the receiving apparatus; and all values of indexes include the following 54 types of precoding information.

The first type of precoding information is a 4-layer transmit diversity.

An $i^{th}$ type of precoding information is that there is one transport layer for transmitting the single codeword, a precoding matrix is a precoding matrix represented by a TPMI, the TPMI=i−2, and i is an integer greater than or equal to 2 and less than or equal to 25.

A $j^{th}$ type of precoding information is that there are two transport layers for transmitting the single codeword, and a precoding matrix is a precoding matrix represented by a TPMI, the TPMI=j−26, and j is an integer greater than or equal to 26 and less than or equal to 41.

A $k^{th}$ type of precoding information is that there are three transport layers for transmitting the single codeword, a precoding matrix is a precoding matrix represented by a TPMI, the TPMI=k−42, and k is an integer greater than or equal to 42 and less than or equal to 53.

The fifty-fourth type of precoding information is that there are four transport layers for transmitting the single codeword, a precoding matrix is a precoding matrix represented by a TPMI, and the TPMI=0.

The first type of precoding information may enable the sending apparatus to redundantly send, when the sending apparatus does not know channel information, the same data by using a plurality of transmit antennas, thereby improving a received signal-to-noise ratio and data transmission reliability. In addition, a PMI feedback is not required in this solution, and therefore, a receiving apparatus in high-speed movement can be supported.

The second type to the fifty-fourth type of precoding information are corresponding to codebook-based precoding. The sending apparatus may allocate, based on a PMI reported by the receiving apparatus, precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there are one to four transport layers for transmitting the single codeword, and a quantity of layers required for various transmission rates may be supported through maximum flexibility.

In the possible implementation, for the correspondence between the index and the precoding information, refer to Table 21. In Table 21, an example in which N=54 is used for drawing.

TABLE 21

4-antenna port precoding information, 6 bits

| Index (Index) | Information (Message) |
|---|---|
| 0 | Four layers: transmit diversity |
| 1 | One layer: TPMI = 0 |
| 2 | One layer: TPMI = 1 |
| . | . |
| . | . |
| . | . |
| 24 | One layer: TPMI = 23 |
| 25 | Two layers: TPMI = 0 |
| 26 | Two layers: TPMI = 1 |
| . | . |
| . | . |
| . | . |
| 40 | Two layers: TPMI = 15 |
| 41 | Three layers: TPMI = 0 |
| 42 | Three layers: TPMI = 1 |
| . | . |
| . | . |
| . | . |
| 52 | Three layers: TPMI = 11 |
| 53 | Four layers: TPMI = 0 |

In Table 19-1, two columns in Table 12 are actually combined into one column, and in Table 21, two columns in Table 13 are actually combined into one column. Because a single-carrier characteristic needs to be ensured during uplink transmission, many types of precoding cannot be applied to the uplink transmission (most typically, when a quantity of uplink layers is equal to a quantity of antenna ports, only one type of precoding, namely, unit matrix precoding, can be supported). In this way, some indexes do not need to be deleted when uplink tables are combined, and on the contrary, a "transmit diversity" (namely, an index 0 in the two tables) may be further added to further improve reliability of the uplink transmission.

In the possible implementation, when the receiving apparatus sends only one codeword to the sending apparatus, the receiving apparatus can still send data by using 2-layer precoding, 3-layer precoding, or 4-layer precoding, flexibility of selecting precoding is not reduced, and transmission efficiency of a system can be maintained. In addition, when N is less than or equal to 64, DCI overheads remain unchanged.

(2) The index is indicated by using 5 bits.

In this case, a maximum of 32 types of precoding information may be configured, so that an index is notified only by using no more than 5 bits, a quantity of bits of DCI is reduced, redundant information during PDCCH transmission is increased, and reliability of the DCI is improved.

In a possible implementation, the single codeword is a codeword sent by the receiving apparatus to the sending apparatus, and there are four antenna ports of the receiving apparatus; and precoding information indicated by all values of indexes includes the following 25 types of precoding information.

The first type of precoding information is a 4-layer transmit diversity.

An $i^{th}$ type of precoding information is that there is one transport layer for transmitting the single codeword, a precoding matrix is a precoding matrix represented by a TPMI, the TPMI=i−2, and i is an integer greater than or equal to 2 and less than or equal to 25.

The first type of precoding information may enable the receiving apparatus to redundantly send, when the receiving apparatus does not know channel information, the same data by using a plurality of transmit antennas, thereby improving a received signal-to-noise ratio and data transmission reliability of the sending apparatus. In addition, a PMI feedback is not required in this solution, and therefore, a receiving apparatus in high-speed movement can be supported.

The second type to the twenty-fifth type of precoding information are corresponding to codebook-based precoding. The sending apparatus allocates precoding performed for full bandwidth to the receiving apparatus. By configuring proper precoding, data transmitted by using a plurality of antenna ports may be coherently superposed on the sending apparatus, to increase received signal energy and improve a received signal-to-noise ratio and data transmission reliability. In addition, there is one transport layer for transmitting each single codeword, and compared with a case in which there is more than one transport layer, the data transmission reliability is higher when there is one transport layer.

In the possible implementation, for the correspondence between the index and the precoding information, refer to Table 22. In Table 22, an example in which N=25 is used for drawing.

TABLE 22

4-antenna port precoding information, 5 bits

| Index (Index) | Information (Message) |
|---|---|
| 0 | Four layers: transmit diversity |
| 1 | One layer: TPMI = 0 |
| 2 | One layer: TPMI = 1 |
| . | . |
| . | . |
| . | . |
| 24 | One layer: TPMI = 23 |

In conclusion, in the method provided in this embodiment of this application, when the base station can schedule only one codeword for the terminal device, the base station can still serve the terminal device by using precoding having a maximum quantity of layers, flexibility of selecting precoding is not reduced, transmission efficiency of a system can be maintained, and DCI overheads remain unchanged. In addition, due to introduction of a "transmit diversity", reliability of the uplink transmission is further improved. The "transmit diversity" in the embodiments of this application may also be referred to as "transmit diversity".

Optionally, the index is an index in a table that is indicated by the sending apparatus to the receiving apparatus by using higher layer signaling, the table that is indicated by the sending apparatus to the receiving apparatus by using the higher layer signaling is one of a plurality of tables, and the table includes the correspondence between the index and the precoding information. It should be noted that a part of the foregoing several tables may be stored on both sides of the base station and the UE, and the base station indicates, by using higher layer signaling, a table used for UE transmission. The UE determines used precoding information based on the table.

The foregoing mainly describes the solutions provided in the embodiments of this application from a perspective of interaction between network elements. It may be understood that to implement the foregoing functions, each network element such as the sending apparatus and the receiving apparatus, includes a corresponding hardware structure and/or software module for performing each function. A person skilled in the art should easily be aware that, in combination with the examples described in the embodiments disclosed in this specification, in this application, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules such as the sending apparatus and the receiving apparatus may be obtained through division based on the foregoing method examples. For example, functional modules may be obtained through division based on functions, or two or more functions may be integrated into one processing module. The foregoing integrated module may be implemented in a form of hardware, or may be implemented in a form of a software functional module. It should be noted that, in the embodiments of this application, module division is an example, and is merely logical function division. During actual implementation, another division manner may be used.

Figure 9:
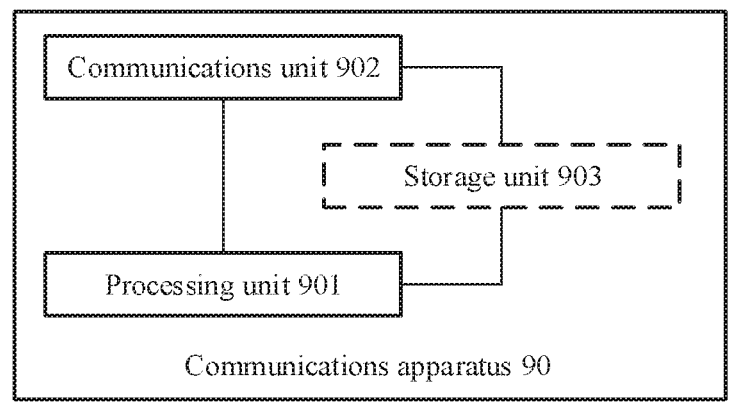
FIG. 9 is a schematic composition diagram of a communications apparatus according to an embodiment of this application.

For example, when an integrated function module is used, FIG. 9 is a possible schematic structural diagram of a communications apparatus in the foregoing embodiments. The communications apparatus 90 may be the foregoing sending apparatus or receiving apparatus. Referring to FIG. 9, FIG. 9 may include a processing unit 901, a communications unit 902, and a storage unit 903.

When the communications apparatus is a sending apparatus, the processing unit 901 is configured to control and manage an action of the sending apparatus. For example, the processing unit 901 is configured to support the sending apparatus in performing step 801 or 802 in FIG. 8 and/or an action performed by the sending apparatus in another process described in the embodiments of this application. The communications unit 902 is configured to support the sending apparatus in communicating with another communications apparatus, for example, communicating with the receiving apparatus in FIG. 8. The storage unit 903 is configured to store program code and data of the sending apparatus.

When the communications apparatus is a receiving apparatus, the processing unit 901 is configured to control and manage an action of the receiving apparatus. For example, the processing unit 901 is configured to support the receiving apparatus in performing step 802 or 803 in FIG. 8, and/or an action performed by the receiving apparatus in another process described in the embodiments of this application. The communications unit 902 is configured to support the receiving apparatus in communicating with another communications apparatus, for example, communicating with the sending apparatus in FIG. 8. The storage unit 903 is configured to store program code and data of the receiving apparatus.

The processing unit 901 may be a processor or a controller. The communications unit 902 may be a communications interface, a transceiver, a transceiver circuit, or the like. The communications interface is a general name and may include one or more interfaces. The storage unit 903 may be a memory. When the processing unit 901 is the processor, the communications unit 902 is the communications interface, and the storage unit 903 is the memory, the communications apparatus in the embodiments of the apparatus may be a communications apparatus shown in FIG. 10.

Figure 10:
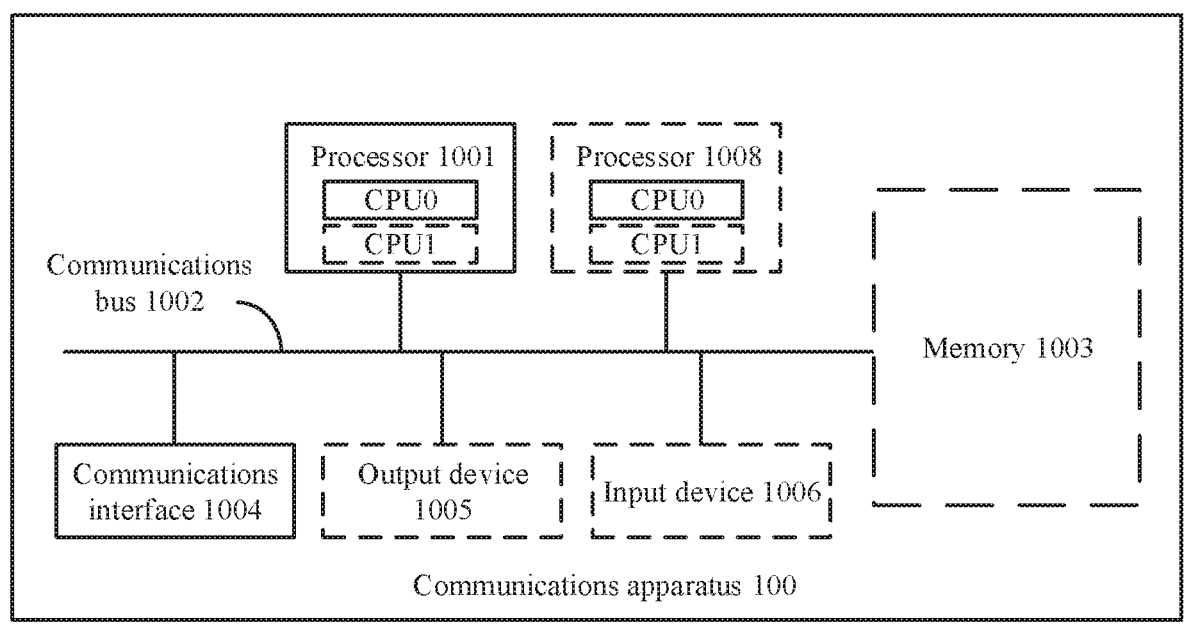
FIG. 10 is a schematic composition diagram of hardware of a communications apparatus according to an embodiment of this application.

FIG. 10 is a schematic structural diagram of hardware of a communications apparatus 100 according to an embodiment of this application. The communications apparatus 100 includes at least one processor 1001, a communications bus 1002, and at least one communications interface 1004. Optionally, the communications apparatus 100 may further include a memory 1003. In an embodiment, the communications apparatus 100 may be a communications device or a chip. Specifically, the communications apparatus 100 may be the foregoing sending apparatus or receiving apparatus.

The processor 1001 may be a general-purpose central processing unit (central processing unit, CPU for short), a microprocessor, an application-specific integrated circuit (application-specific integrated circuit, ASIC for short), or one or more integrated circuits configured to control program execution of the solutions of this application.

The communications bus 1002 may include a path for transferring information between the foregoing components.

The communications interface 1004 is configured to communicate with another component, or communicate with another device or a communication network such as an Ethernet, a RAN or a WLAN. In an embodiment, the communications interface may be any apparatus such as a transceiver, and is configured to communicate with another device. For example, the communications interface may be a transceiver in the communications device.

The memory 1003 may be a read-only memory (read-only memory, ROM for short) or another type of static storage device that can store static information and a static instruction, or a random access memory (random access memory, RAM for short) or another type of dynamic storage device that can store information and an instruction, or may be an electrically erasable programmable read-only memory (electrically erasable programmable read-only memory, EEPROM for short), a compact disc read-only memory (compact disc read-only memory, CD-ROM for short) or another compact disc storage medium, optical disc storage medium (including a compact disc, a laser disc, an optical disc, a digital versatile disc, a Blu-ray disc, and the like), magnetic disk storage medium, another magnetic storage device, or any other medium that can be configured to carry or store expected program code in a form of an instruction or a data structure and that is accessible to a computer, but is not limited thereto. The memory may exist independently, and be connected to the processor by using the bus. The memory may alternatively be integrated with the processor.

The memory 1003 is configured to store application program code for performing the solutions of this application, and execution of the application program code is controlled by the processor 1001. The processor 1001 is configured to execute the application program code stored in the memory 1003, thereby implementing the methods provided in the foregoing embodiments of this application.

During specific implementation, in an embodiment, the processor 1001 may include one or more CPUs, such as a CPU 0 and a CPU 1 in FIG. 10.

During specific implementation, in an embodiment, the communications apparatus 100 may include a plurality of processors, for example, the processor 1001 and a processor 1008 in FIG. 10. Each of the processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the communications apparatus 100 may further include an output device 1005 and an input device 1006.

When the communications apparatus shown in FIG. 10 is a sending apparatus, the processor 1001 is configured to control and manage an action of the sending apparatus. For example, the processor 1001 is configured to support the sending apparatus in performing step 801 or 802 in FIG. 8 and/or an action performed by the sending apparatus in another process described in the embodiments of this application. The communications interface 1004 is configured to support the sending apparatus in communicating with another communications apparatus, for example, communicating with the receiving apparatus in FIG. 8. The memory 1003 is configured to store program code and data of the sending apparatus.

When the communications apparatus shown in FIG. 10 is a receiving apparatus, the processor 1001 is configured to control and manage an action of the receiving apparatus. For example, the processor 1001 is configured to support the receiving apparatus in performing step 802 or 803 in FIG. 8 and/or an action performed by the receiving apparatus in another process described in the embodiments of this application. The communications interface 1004 is configured to support the receiving apparatus in communicating with another communications apparatus, for example, communicating with the sending apparatus in FIG. 8. The memory 1003 is configured to store program code and data of the receiving apparatus.

An embodiment of this application further provides a computer-readable storage medium including an instruction. When the instruction is run on a computer, the computer is enabled to perform the foregoing methods.

An embodiment of this application further provides a computer program product including an instruction. When the computer program product is run on a computer, the computer is enabled to perform the foregoing methods.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments of this application all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that such measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An information receiving method, comprising:
receiving, by a receiving apparatus, an index from a sending apparatus, wherein the index indicates precoding information used for a single codeword;
receiving, by the receiving apparatus from the sending apparatus by using higher layer signaling, an indication of a table of a plurality of tables, wherein the table comprises a correspondence between the index and the precoding information; and
determining, by the receiving apparatus based on the index and the table, the precoding information used for the single codeword.

2. The method according to claim 1, wherein:
the single codeword is a codeword sent by the sending apparatus to the receiving apparatus, and wherein there are two antenna ports of the sending apparatus; or
the single codeword is a codeword sent by the receiving apparatus to the sending apparatus, wherein there are two antenna ports of the receiving apparatus, and wherein a quantity of values of indexes is less than or equal to 4.

3. The method according to claim 2, wherein:
the single codeword is the codeword sent by the sending apparatus to the receiving apparatus, and wherein there are two antenna ports of the sending apparatus;
at least one of the following is true:
precoding information indicated by all values of indexes comprises the following four types of precoding information;
precoding information indicated by all values of indexes comprises at least two types of the following four types of precoding information; or
precoding information indicated by all values of indexes comprises a first type and a fourth type of the following four types of precoding information;
the first type of precoding information indicates a 2-layer transmit diversity;
a second type of precoding information indicates that there is one transport layer for transmitting the single codeword, and that a precoding matrix is $[1\ 1]^T/\sqrt{2}$;
a third type of precoding information indicates that there is one transport layer for transmitting the single codeword, and that a precoding matrix is $[1\ -1]^T/\sqrt{2}$; and
the fourth type of precoding information indicates a precoding matrix reported by a latest precoding matrix indication PMI carried on a physical uplink shared channel (PUSCH).

4. The method according to claim 2, wherein:
the single codeword is the codeword sent by the receiving apparatus to the sending apparatus, wherein there are two antenna ports of the receiving apparatus;
at least one of the following is true:
precoding information indicated by all values of indexes comprises the following four types of precoding information; or
precoding information indicated by all values of indexes comprises at least two types of the following four types of precoding information;
a first type of precoding information indicates a 2-layer transmit diversity;
a second type of precoding information indicates that there is one transport layer for transmitting the single codeword, and that a precoding matrix is $[1\ 1]^T/\sqrt{2}$;
a third type of precoding information indicates that there is one transport layer for transmitting the single codeword, and that a precoding matrix is $[1\ 0]^T/\sqrt{2}$; and
a fourth type of precoding information indicates that there is one transport layer for transmitting the single codeword, and that a precoding matrix is $[0\ 1]^T/\sqrt{2}$.

5. The method according to claim 1, wherein:
the single codeword is a codeword sent by the sending apparatus to the receiving apparatus, and wherein there are four antenna ports of the sending apparatus; or
the single codeword is a codeword sent by the receiving apparatus to the sending apparatus, wherein there are four antenna ports of the receiving apparatus, and wherein a quantity of values of indexes is less than or equal to 32.

6. The method according to claim 5, wherein:
the single codeword is the codeword sent by the sending apparatus to the receiving apparatus, and wherein there are four antenna ports of the sending apparatus;

at least one of the following is true:
- precoding information indicated by all values of indexes comprises the following 21 types of precoding information;
- precoding information indicated by all values of indexes comprises at least 18 types of the following 21 types of precoding information; or
- precoding information indicated by all values of indexes comprises a first type to an eighteenth type of the following 21 types of precoding information;

the first type of precoding information indicates a 4-layer transmit diversity;

an $i^{th}$ type of precoding information indicates that there is one transport layer for transmitting the single codeword, and that a precoding matrix is a precoding matrix represented by a transmit precoding matrix indication (TPMI), wherein the TPMI=i−2, and wherein i is an integer greater than or equal to 2 and less than or equal to 17;

the eighteenth type of precoding information indicates that there is one transport layer for transmitting the single codeword, and that a precoding matrix is a precoding matrix reported by a latest PMI carried on a PUSCH;

a nineteenth type of precoding information indicates that there are two transport layers for transmitting the single codeword, and that a precoding matrix is a precoding matrix reported by the latest PMI carried on the PUSCH;

a twentieth type of precoding information indicates that there are three transport layers for transmitting the single codeword, and that a precoding matrix is a precoding matrix reported by the latest PMI carried on the PUSCH; and a twenty-first type of precoding information indicates that there are four transport layers for transmitting the single codeword, and that a precoding matrix is a precoding matrix reported by the latest PMI carried on the PUSCH.

7. The method according to claim 5, wherein:
the single codeword is the codeword sent by the sending apparatus to the receiving apparatus, and wherein there are four antenna ports of the sending apparatus;
at least one of the following is true:
- precoding information indicated by all values of indexes comprises the following 13 types of precoding information;
- precoding information indicated by all values of indexes comprises at least 10 types of the following 13 types of precoding information; or
- precoding information indicated by all values of indexes comprises a first type to a tenth type of the following 13 types of precoding information;

the first type of precoding information indicates a 4-layer transmit diversity;

an $i^{th}$ type of precoding information indicates that there is one transport layer for transmitting the single codeword, and that a precoding matrix is a precoding matrix represented by a TPMI, wherein the TPMI=a(i−2), wherein i is an integer greater than or equal to 2 and less than or equal to 9, and wherein a0, a1, . . . , a6, and a7 are seven different values in 0, 1, . . . , 14, and 15;

the tenth type of precoding information indicates that there is one transport layer for transmitting the single codeword, and that a precoding matrix is a precoding matrix reported by a latest PMI carried on a PUSCH;

an eleventh type of precoding information indicates that there are two transport layers for transmitting the single codeword, and that a precoding matrix is a precoding matrix reported by the latest PMI carried on the PUSCH;

a twelfth type of precoding information indicates that there are three transport layers for transmitting the single codeword, and that a precoding matrix is a precoding matrix reported by the latest PMI carried on the PUSCH; and a thirteenth type of precoding information indicates that there are four transport layers for transmitting the single codeword, and that a precoding matrix is a precoding matrix reported by the latest PMI carried on the PUSCH.

8. The method according to claim 5, wherein:
the single codeword is a codeword sent by the receiving apparatus to the sending apparatus, and wherein there are four antenna ports of the receiving apparatus; and
precoding information indicated by all values of indexes comprises the following 25 types of precoding information:
- a first type of precoding information indicates a 4-layer transmit diversity; and
- an $i^{th}$ type of precoding information indicates that there is one transport layer for transmitting the single codeword, and that a precoding matrix is a precoding matrix represented by a TPMI, wherein the TPMI=i−2, and wherein i is an integer greater than or equal to 2 and less than or equal to 25.

9. The method according to claim 1, wherein:
the single codeword is a codeword sent by the sending apparatus to the receiving apparatus, and wherein there are two antenna ports of the sending apparatus; or
the single codeword is a codeword sent by the receiving apparatus to the sending apparatus, wherein there are two antenna ports of the receiving apparatus, and wherein there are two columns in a precoding matrix corresponding to precoding information indicated by an index corresponding to at least one of values of indexes.

10. The method according to claim 9, wherein:
the single codeword is the codeword sent by the sending apparatus to the receiving apparatus, and wherein there are two antenna ports of the sending apparatus; and
all values of indexes comprise the following eight types of precoding information:
- a first type of precoding information indicates a 2-layer transmit diversity;
- a second type of precoding information indicates that there is one transport layer for transmitting the single codeword, and that a precoding matrix is $[1\ 1]^{T}/\sqrt{2}$;
- a third type of precoding information indicates that there is one transport layer for transmitting the single codeword, and that a precoding matrix is $[1\ -1]^{T}/\sqrt{2}$;
- a fourth type of precoding information indicates that there is one transport layer for transmitting the single codeword, and that a precoding matrix is $[1\ j]^{T}/\sqrt{2}$;
- a fifth type of precoding information indicates that there is one transport layer for transmitting the single codeword, and that a precoding matrix is $[1\ -j]^{T}/\sqrt{2}$;
- a sixth type of precoding information indicates that there are two transport layers for transmitting the single codeword, and that a precoding matrix is $$\frac{1}{2}\begin{bmatrix} 1 & 1 \\ 1 & -1 \end{bmatrix};$$

a seventh type of precoding information indicates that there are two transport layers for transmitting the single codeword, and that a precoding matrix is $$\frac{1}{2}\begin{bmatrix} 1 & 1 \\ j & -j \end{bmatrix};$$

and
an eighth type of precoding information indicates that a precoding matrix is a precoding matrix reported by a latest PMI carried on a PUSCH.

11. The method according to claim 9, wherein:
the single codeword is the codeword sent by the receiving apparatus to the sending apparatus, and wherein there are two antenna ports of the receiving apparatus; and
all values of indexes comprise the following eight types of precoding information:
 a first type of precoding information indicates a 2-layer transmit diversity;
 an $i^{th}$ type of precoding information indicates that there is one transport layer for transmitting the single codeword, and that a precoding matrix is a precoding matrix represented by a TPMI, wherein the TPMI=i−2, and wherein i is an integer greater than 2 and less than or equal to 7; and
 an eighth type of precoding information indicates that there are two transport layers for transmitting the single codeword, and that a precoding matrix is a precoding matrix represented by a TPMI, and wherein the TPMI=0.

12. The method according to claim 1, wherein:
the single codeword is a codeword sent by the sending apparatus to the receiving apparatus, and wherein there are four antenna ports of the sending apparatus; or
the single codeword is a codeword sent by the receiving apparatus to the sending apparatus, wherein there are four antenna ports of the receiving apparatus, and wherein there are three or four columns in a precoding matrix corresponding to precoding information indicated by an index corresponding to at least one of values of indexes.

13. The method according to claim 12, wherein:
the single codeword is the codeword sent by the sending apparatus to the receiving apparatus, and wherein there are four antenna ports of the sending apparatus; and
all values of indexes comprise the following 61 types of precoding information:
 a first type of precoding information indicates a 4-layer transmit diversity;
 an $i^{th}$ type of precoding information indicates that there is one transport layer for transmitting the single codeword, and that a precoding matrix is a precoding matrix represented by a TPMI, wherein the TPMI=i−2, and wherein i is an integer greater than or equal to 2 and less than or equal to 17;
 an eighteenth type of precoding information indicates that there is one transport layer for transmitting the single codeword, and that a precoding matrix is a precoding matrix reported by a latest PMI carried on a PUSCH;
 a $j^{th}$ type of precoding information indicates that there are two transport layers for transmitting the single codeword, and that a precoding matrix is a precoding matrix represented by a TPMI, wherein the TPMI=j−19, and wherein j is an integer greater than or equal to 19 and less than or equal to 34;
 a thirty-fifth type of precoding information indicates that there are two transport layers for transmitting the single codeword, and that a precoding matrix is a precoding matrix reported by the latest PMI carried on the PUSCH;
 a $k^{th}$ type of precoding information indicates that there are three transport layers for transmitting the single codeword, and that a precoding matrix is a precoding matrix represented by a TPMI, wherein the TPMI=k−36, and wherein k is an integer greater than or equal to 36 and less than or equal to 51;
 a fifty-second type of precoding information indicates that there are three transport layers for transmitting the single codeword, and that a precoding matrix is a precoding matrix reported by the latest PMI carried on the PUSCH;
 a $g^{th}$ type of precoding information indicates that there are four transport layers for transmitting the single codeword, and that a precoding matrix is a precoding matrix represented by a TPMI, wherein the TPMI=a(g−53), wherein g is an integer greater than or equal to 53 and less than or equal to 60, and wherein a0, a1, . . . , a6, and a7 are seven different values in 0, 1, . . . , 14, and 15; and
 a sixty-first type of precoding information indicates that there are four transport layers for transmitting the single codeword, and that a precoding matrix is a precoding matrix reported by the latest PMI carried on the PUSCH.

14. The method according to claim 12, wherein:
the single codeword is the codeword sent by the receiving apparatus to the sending apparatus, and wherein there are four antenna ports of the receiving apparatus; and
all values of indexes comprise the following 54 types of precoding information:
 a first type of precoding information indicates a 4-layer transmit diversity;
 an $i^{th}$ type of precoding information indicates that there is one transport layer for transmitting the single codeword, and that a precoding matrix is a precoding matrix represented by a TPMI, wherein the TPMI=i−2, and wherein i is an integer greater than or equal to 2 and less than or equal to 25;
 a $j^{th}$ type of precoding information indicates that there are two transport layers for transmitting the single codeword, and that a precoding matrix is a precoding matrix represented by a TPMI, wherein the TPMI=j−26, and wherein j is an integer greater than or equal to 26 and less than or equal to 41;
 a $k^{th}$ type of precoding information indicates that there are three transport layers for transmitting the single codeword, and that a precoding matrix is a precoding matrix represented by a TPMI, wherein the TPMI=k−42, and wherein k is an integer greater than or equal to 42 and less than or equal to 53; and
 a fifty-fourth type of precoding information indicates that there are four transport layers for transmitting the single codeword, and that a precoding matrix is a precoding matrix represented by a TPMI, wherein the TPMI=0.

15. A receiving apparatus, comprising:
at least one processor;
a transceiver; and
one or more memories coupled to the at least one processor and storing programming instructions for execution by the at least one processor to:
receive an index from a sending apparatus, wherein the index indicates precoding information used for a single codeword;
receive, by the receiving apparatus from the sending apparatus by using higher layer signaling, an indication of a table of a plurality of tables, wherein the table comprises a correspondence between the index and the precoding information; and
determine, based on the index and the table, the precoding information used for the single codeword.

16. The receiving apparatus according to claim 15, wherein:
the single codeword is a codeword sent by the sending apparatus to the receiving apparatus, and wherein there are two antenna ports of the sending apparatus; or
the single codeword is a codeword sent by the receiving apparatus to the sending apparatus, wherein there are two antenna ports of the receiving apparatus, and wherein a quantity of values of indexes is less than or equal to 4.

17. The receiving apparatus according to claim 16, wherein:
the single codeword is the codeword sent by the sending apparatus to the receiving apparatus, and wherein there are two antenna ports of the sending apparatus;
at least one of the following is true:
precoding information indicated by all values of indexes comprises the following four types of precoding information;
precoding information indicated by all values of indexes comprises at least two types of the following four types of precoding information; or
precoding information indicated by all values of indexes comprises a first type and a fourth type of the following four types of precoding information;
the first type of precoding information indicates a 2-layer transmit diversity;
a second type of precoding information indicates that there is one transport layer for transmitting the single codeword, and that a precoding matrix is $[1\ 1]^T/\sqrt{2}$;
a third type of precoding information indicates that there is one transport layer for transmitting the single codeword, and that a precoding matrix is $[1\ -1]^T/\sqrt{2}$; and
the fourth type of precoding information indicates a precoding matrix reported by a latest precoding matrix indication PMI carried on a physical uplink shared channel (PUSCH).

18. The receiving apparatus according to claim 16, wherein:
the single codeword is the codeword sent by the receiving apparatus to the sending apparatus, wherein there are two antenna ports of the receiving apparatus;
at least one of the following is true:
precoding information indicated by all values of indexes comprises the following four types of precoding information; or
precoding information indicated by all values of indexes comprises at least two types of the following four types of precoding information;
a first type of precoding information indicates a 2-layer transmit diversity;
a second type of precoding information indicates that there is one transport layer for transmitting the single codeword, and that a precoding matrix is $[1\ 1]^T/\sqrt{2}$;
a third type of precoding information indicates that there is one transport layer for transmitting the single codeword, and that a precoding matrix is $[1\ 0]^T/\sqrt{2}$; and
a fourth type of precoding information indicates that there is one transport layer for transmitting the single codeword, and that a precoding matrix is $[0\ 1]^T/\sqrt{2}$.

19. A non-transitory, computer-readable storage medium storing one or more instructions, wherein when the one or more instructions are executed on a computer, the computer is enabled to perform operations comprising:
receiving, by a receiving apparatus, an index from a sending apparatus, wherein the index indicates precoding information used for a single codeword;
receiving, by the receiving apparatus from the sending apparatus by using higher layer signaling, an indication of a table of a plurality of tables, wherein the table comprises a correspondence between the index and the precoding information; and
determining, by the receiving apparatus based on the index and the table, the precoding information used for the single codeword.

* * * * *